(12) United States Patent
Lamanna et al.

(10) Patent No.: US 8,101,302 B2
(45) Date of Patent: Jan. 24, 2012

(54) REDOX SHUTTLES FOR HIGH VOLTAGE CATHODES

(75) Inventors: William M. Lamanna, Stillwater, MN (US); Michael J. Bulinski, Houlton, WI (US); Jeffrey R. Dahn, UpperTantallon (CA); Junwei Jiang, Woodbury, MN (US); Lee Moshurchak, Halifax (CA); Phat T. Pham, Little Canada, MN (US); Richard L. Wang, Halifax (CA)

(73) Assignee: 3M Innovative Properties Company, St. Paul, MN (US)

( * ) Notice: Subject to any disclaimer, the term of this patent is extended or adjusted under 35 U.S.C. 154(b) by 478 days.

(21) Appl. No.: 12/366,002

(22) Filed: Feb. 5, 2009

(65) Prior Publication Data

US 2009/0286162 A1 Nov. 19, 2009

Related U.S. Application Data

(60) Provisional application No. 61/027,963, filed on Feb. 12, 2008.

(51) Int. Cl.
*H01M 6/18* (2006.01)
(52) U.S. Cl. ...................................... 429/307
(58) Field of Classification Search ............... 429/306, 429/307, 105, 188, 199; 29/623.1
See application file for complete search history.

(56) References Cited

U.S. PATENT DOCUMENTS

| | | | |
|---|---|---|---|
| 4,670,363 A | 6/1987 | Whitney et al. | |
| 4,869,977 A | 9/1989 | Connolly et al. | |
| 5,506,068 A | 4/1996 | Dan et al. | |
| 5,709,968 A * | 1/1998 | Shimizu ............. | 429/324 |
| 5,759,714 A | 6/1998 | Matsufuji et al. | |
| 5,858,573 A | 1/1999 | Abraham et al. | |
| 5,879,834 A | 3/1999 | Mao | |
| 5,976,731 A | 11/1999 | Negoro et al. | |
| 6,004,698 A | 12/1999 | Richardson et al. | |
| 6,074,777 A | 6/2000 | Reimers et al. | |
| 6,203,944 B1 | 3/2001 | Turner et al. | |
| 6,203,946 B1 | 3/2001 | Barker et al. | |
| 6,905,799 B2 | 6/2005 | Okahara et al. | |
| 6,908,709 B2 | 6/2005 | Miyaki | |
| 6,942,949 B2 | 9/2005 | Besenhard et al. | |
| 7,019,494 B2 | 3/2006 | Mikhaylik | |
| 7,074,523 B2 | 7/2006 | Arai et al. | |
| 7,294,436 B2 | 11/2007 | Abe et al. | |
| 2001/0004507 A1 | 6/2001 | Gan et al. | |
| 2003/0044681 A1 | 3/2003 | Morioka et al. | |
| 2005/0042519 A1 | 2/2005 | Roh et al. | |
| 2005/0156575 A1 | 7/2005 | Mikhaylik | |
| 2005/0221168 A1 | 10/2005 | Dahn et al. | |
| 2005/0221196 A1 | 10/2005 | Dahn et al. | |
| 2006/0263695 A1 | 11/2006 | Dahn et al. | |
| 2006/0263697 A1 | 11/2006 | Dahn et al. | |
| 2007/0020522 A1 | 1/2007 | Obrovac et al. | |
| 2007/0020528 A1 | 1/2007 | Obrovac et al. | |
| 2007/0178370 A1 | 8/2007 | Amine et al. | |
| 2008/0050658 A1 | 2/2008 | Abe et al. | |

FOREIGN PATENT DOCUMENTS

| | | |
|---|---|---|
| EP | 0 825 663 A2 | 2/1998 |
| EP | 1 160 905 A2 | 12/2001 |
| EP | 1 324 417 A1 | 7/2003 |
| EP | 1 361 622 A1 | 11/2003 |
| EP | 1 528 616 A | 5/2005 |
| GB | 1066928 | 4/1967 |
| JP | 61-279061 | 12/1986 |
| JP | 62-82649 | 4/1987 |
| JP | 63-55861 | 3/1988 |
| JP | 63-55868 | 3/1988 |
| JP | 05-036439 | 2/1993 |
| JP | 05-041251 | 2/1993 |
| JP | 05-295058 | 11/1993 |
| JP | 63-38347 | 12/1994 |
| JP | 07-302614 | 11/1995 |
| JP | 08236155 A | 9/1996 |
| JP | 2000156243 | 6/2000 |
| JP | 2000-235867 | 8/2000 |
| JP | 2000-268861 | 9/2000 |
| JP | 2000-348725 | 12/2000 |
| JP | 2001-015156 | 1/2001 |
| JP | 2001-023687 | 1/2001 |
| JP | 2001-196061 | 7/2001 |
| JP | 2001-283920 | 10/2001 |
| JP | 2003132950 | 5/2003 |
| JP | 2003203673 | 7/2003 |
| JP | 2003217652 | 7/2003 |
| JP | 2003272701 | 9/2003 |
| JP | 2004-006400 | 1/2004 |
| JP | 2006/073241 | 3/2006 |
| JP | 2006 252917 A | 9/2006 |
| WO | WO 00/03444 | 1/2000 |
| WO | WO 01/29920 A1 | 4/2001 |

(Continued)

OTHER PUBLICATIONS

M. Taggougui, B. Carre, P. Willmann, D. Lemordant. 2,5-Difluoro-1,4-dimethoxybenzene for overcharge protection of secondary lithium batteries, J. Power Sources 2007, 174, 1069-1073.*

(Continued)

*Primary Examiner* — Jerry Lorengo
*Assistant Examiner* — Carlos Barcena
(74) *Attorney, Agent, or Firm* — Stephen F. Wolf

(57) ABSTRACT

Overcharge protection is provided for rechargeable electrochemical lithium-ion cells. The electrolyte in the provided cells contains a cyclable redox shuttle molecule that can operate in cells with high voltage cathode materials.

20 Claims, 11 Drawing Sheets

FOREIGN PATENT DOCUMENTS

| | | |
|---|---|---|
| WO | WO 2005/069405 A2 | 7/2005 |
| WO | WO 2005099024 | 10/2005 |

OTHER PUBLICATIONS

L. M. Moshurchak, W. M. Lamanna, M. Bulinski, R. L. Wang, R. R. Garsuch, J. Jiang, D. Magnuson, M. Triemert, J. R. Dahn. High-Potential Redox Shuttle for Use in Lithium-Ion Batteries, J. Electrochem. Soc. 2009, 156(4), A309-A312.*

Balakrishnan, P.G., et al., "Safety Mechanisms in Lithium-Ion Batteries," *Journal of Power Sources*, vol. 155, No. 2, (Apr. 21, 2006), pp. 401-414.

Buhrmester et al., "Phenothiazine Molecules—Possible Redox Shuttle Additives for Chemical Overcharge and Overdischarge Protection for Lithium-Ion Batteries", *J. Electrochem. Soc.*, vol. 153, No. 2, (2006), pp. A288-A294.

Burdon et al., "Aromatic Polyfluoro-compounds. Part XIX.[1] The Preparation of Some Polyfluorodi- and Polyfluorotri-phenylamines." *J. Chem. Soc.* (1964), pp. 5017-5021.

Dapperheld et al., "Substituted Triarylamine Cation-Radical Redox Systems—Synthesis, Electrochemical and Spectroscopic Properties, Hammet Behavior, and Suitability as Redox Catalysts", *Chem. Ber.*, vol. 124 (1991), pp. 2557-2567.

Miller et al., "Reactions of polyfluoroarenes with hexamethyldisilazane and with 1,1,1-trimethyl-N,N-bis(trimethylsilyl) stannaneamine in the presence of caesium fluoride", *J. of Fluorine Chemistry*, vol. 75, (1995), pp. 169-172.

Schmidt et al., "Elektrochemische und spektroskopische Untersuchung bromsubstituierter Triarylamin-Redoxsysteme", *Chem. Ber.*, vol. 113 (1980), pp. 577-585.

Wang et al., "Calculations of Oxidation Potentials of Redox Shuttle Additives for Li-Ion Cells", *J. of Electrochem. Soc.*, vol. 153, No. 2, (2006), pp. A445-A449.

Walter, "Triarylaminium Salt Free Radicals", *J. Am. Chem. Soc.*, vol. 77 (1955), pp. 5999-6002.

Narayanan, S. R., et al., "Analysis of Redox Additive-Based Overcharge Protection for Rechargeable Lithium Batteries," *Journal of the Electrochemical Society*, vol. 138, No. 8, Aug. 1, 1991, pp. 2224-2229.

T. J. Richardson, P. N. Ross, Jr., "Overcharge Protection for Rechargeable Lithium Polymer Electrolyte Batteries", *J. Electrochem. Soc.*, vol. 143, 3992-3996 (1996).

K. M. Colbow, J. R. Dahn, R. R. Haering, "Structure and Electrochemistry of the Spinel Oxides $LiTi_2O_4$ and $Li_{4/3}Ti_{5/3}O_4$", *J. Power Sources*, vol. 26, 397-402 (1989).

A. M. Wilson and J. R. Dahn, "Lithium Insertion in Carbons Containing Nanodispersed Silicon", *J. Electrochem. Soc.*, vol. 142, 326-332 (1995).

Lee et al., "Development of the Colle-Salvetti correlation-energy formula into a functional of the electron density", *Physical Review B*, vol. 37, No. 2, Jan. 1988, pp. 785-789.

* cited by examiner

REDOX SHUTTLES FOR HIGH VOLTAGE CATHODES

RELATED APPLICATIONS

This application claims priority to U.S. Provisional Patent Application Ser. No. 61/027,963, filed on Feb. 12, 2008, which is herein incorporated by reference in its entirety.

FIELD

Overcharge protection is provided for rechargeable electrochemical lithium-ion cells.

BACKGROUND

When properly designed and constructed, rechargeable lithium-ion cells can exhibit excellent charge-discharge cycle life, little or no memory effect, and high specific and volumetric energy. However, lithium-ion cells do have some shortcomings, including an inability to tolerate recharging to potentials above the manufacturer's recommended end of charge potential without degradation in cycle life; the danger of overheating, or adverse thermal event for cells recharged to potentials above the recommended end of charge potential; and difficulties in making large cells having sufficient tolerance to electrical and mechanical abuse for consumer applications. Single and connected (e.g., series-connected) lithium-ion cells typically incorporate charge control electronics to prevent individual cells from exceeding the recommended end of charge potential and to maintain charge balance between the cells. This circuitry adds cost and complexity and has discouraged the use of lithium ion cells and batteries in low-cost mass market electrical and electronic devices such as flashlights, radios, CD players and the like.

SUMMARY

There is a need for robust, high performance, chemical redox shuttles that operate at high voltage and can provide overcharge protection for lithium-ion electrochemical cells and batteries. The availability of these shuttles could enable low cost mass market applications for rechargeable lithium ion batteries and accelerate applications in power tools and plug-in hybrid electric vehicles as well.

In one aspect, a rechargeable electrochemical cell is provided that includes a positive electrode having at least one electroactive material having a recharged potential, a negative electrode, a charge-carrying electrolyte comprising a charge carrying medium and an electrolyte salt, and a cyclable redox chemical shuttle comprising an aromatic compound substituted with at least one tertiary alkyl group and at least one halogenated alkoxy group dissolved in or dissolvable in the electrolyte and having an oxidation potential above the recharged potential of at least one of the electroactive materials of the positive electrode.

In another aspect, a rechargeable electrochemical cell is provided that includes a positive electrode having at least one electroactive material having a recharged potential, a negative electrode, a charge-carrying electrolyte comprising a charge carrying medium and an electrolyte salt, and a cyclable redox chemical shuttle comprising an alkoxy-substituted fluoronaphthalene compound dissolved in or dissolvable in the electrolyte and having an oxidation potential above the recharged potential of at least one of the electroactive materials of the positive electrode.

In yet another aspect, a rechargeable lithium-ion cell is provided that includes a positive electrode having at least one electroactive material having a recharged potential and comprising $LiFePO_4$; $Li_2FeSiO_4$; $MnO_2$; $LiMn_2O_4$; $LiMnPO_4$; $LiCoO_2$; $LiNi_{0.5}Mn_{1.5}O_4$; lithium mixed metal oxides of nickel, cobalt, and aluminum (NCA); lithium mixed metal oxides of manganese, nickel, and cobalt (MNC); combinations of the above; or doped versions thereof, a negative electrode comprising graphitic carbon, lithium metal, lithium titanate, or a lithium alloy; and a charge-carrying electrolyte that includes a charge-carrying media comprising ethylene carbonate, propylene carbonate, dimethyl carbonate, diethyl carbonate, vinylene carbonate, ethyl methyl carbonate, or combinations thereof, a lithium salt with high ionic conductivity, and a cyclable redox chemical shuttle selected from an aromatic compound substituted with at least one tertiary alkyl group and at least one halogenated alkoxy group, an alkoxy-substituted fluoronaphthalene compound, octafluoronaphthalene, or a combination thereof, wherein the shuttle is dissolved in or dissolvable in the electrolyte and wherein the shuttle has an oxidation potential above the recharged potential of at least one of the electroactive materials of the positive electrode.

Also, a method of making a rechargeable electrochemical cell is provided the includes providing a cell containing a positive electrode having at least one electroactive material having a recharged potential, and a negative electrode and adding a charge-carrying electrolyte comprising a charge carrying medium and an electrolyte salt to the cell, and a cyclable redox chemical shuttle selected from an aromatic compound substituted with at least one tertiary alkyl group and at least one halogenated alkoxy group, an alkoxy-substituted fluoronaphthalene compound, or a combination thereof, wherein the shuttle is dissolved in or dissolvable in the electrolyte and wherein the shuttle has an oxidation potential above the recharged potential of at least one of the electroactive materials of the positive electrode.

Finally, an electrolyte solution is provided that includes a charge-carrying medium, an electrolyte salt, and a cyclable redox chemical shuttle selected from an aromatic compound substituted with at least one tertiary alkyl group and at least one halogenated alkoxy group, an alkoxy-substituted fluoronaphthalene compound, or a combination thereof, wherein the redox chemical shuttle has a reversible oxidation potential from about 3.7 V to about 4.8 V vs. $Li/Li^+$.

As used herein:

"a", and "an" are used interchangeably with "at least one" to mean one or more of the elements being described;

"charge" and "charging" refer to a process for providing electrochemical energy to a cell;

"delithiate" and "delithiation" refer to a process for removing lithium from an electrode material;

"discharge" and "discharging" refer to a process for removing electrochemical energy from a cell, e.g., when using the cell to perform desired work;

"electrochemically active material" or "electroactive material" refers to a material that can undergo electrochemical lithiation and delithiation, or otherwise store electrochemical energy;

"lithiate" and "lithiation" refer to a process for adding lithium to an electrode material; and "principal positive electrode material" refers to the positive electrode material that carries the greatest capacity within a positive electrode that includes multiple positive electrode materials.

The provided electrochemical cells, and lithium-ion batteries incorporating these cells, exhibit one or more desirable performance characteristics such as high initial capacities, high average voltages, and good capacity retention after repeated charge-discharge cycling. In addition, the provided cells do not evolve substantial amounts of heat during elevated temperature use, thereby improving battery safety since they are protected from overcharge. In some embodiments, the disclosed compositions exhibit several, or even all, of these advantages.

The above summary is not intended to describe each disclosed embodiment of every implementation of the present invention. The brief description of the drawings and the detailed descriptions which follow more particularly exemplify illustrative embodiments.

DETAILED DESCRIPTION

Figure 1:
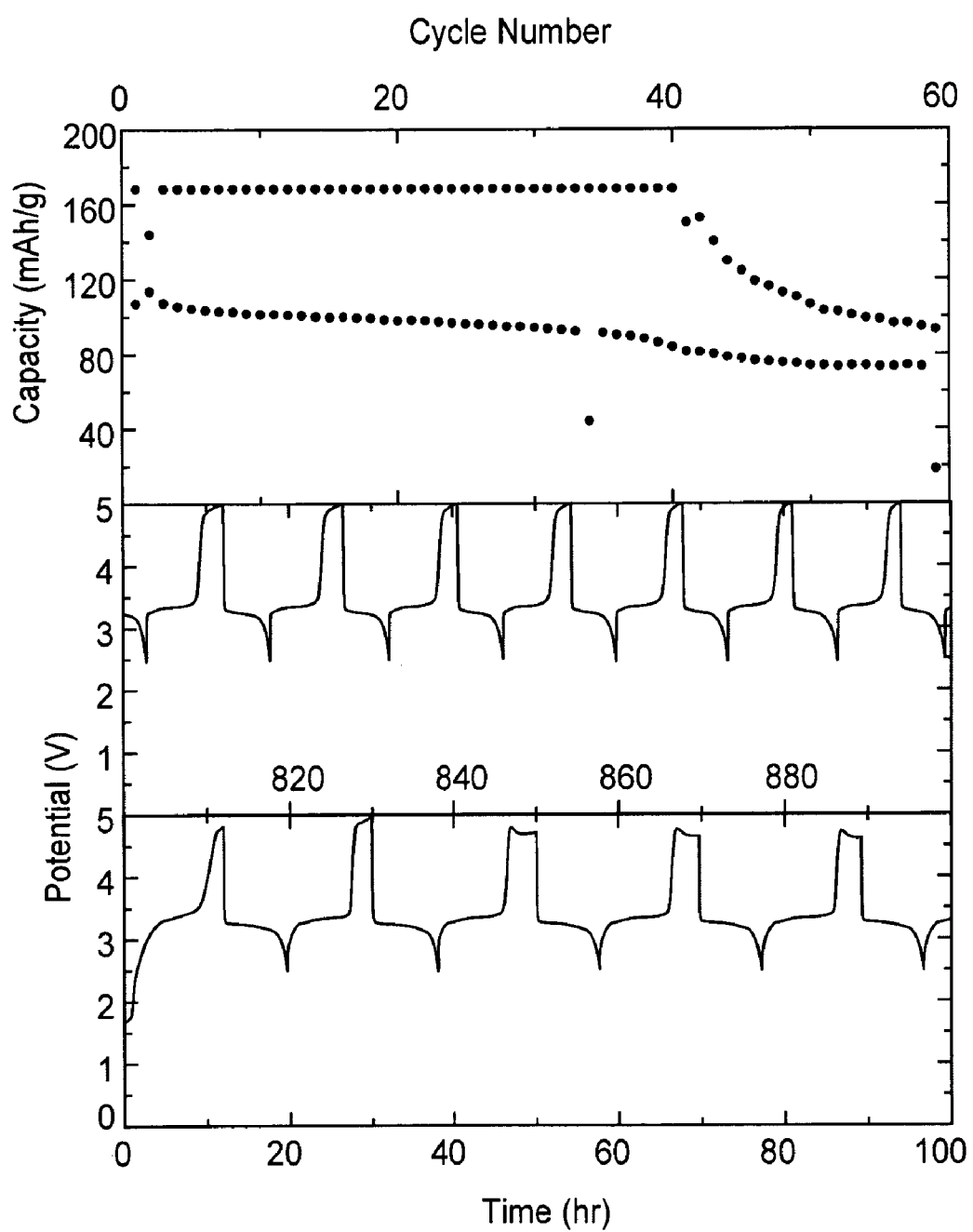
FIG. 1 is a graph of cycle number vs. charge/discharge capacity (mAh/g) (top panel) and time (h) vs. potential (V) (bottom panel) of an embodiment of the provided electrochemical cells.

The recitation of numerical ranges includes all numbers within that range (e.g., 1 to 5 includes 1, 1.5, 2, 2.75, 3, 3.80, 4, and 5). All numbers are herein assumed to be modified by the term "about".

The phrase "positive electrode" refers to one of a pair of rechargeable cell electrodes that under normal circumstances and when the cell is fully charged will have the highest potential. We retain this terminology to refer to the same physical electrode under all cell operating conditions even if such electrode temporarily (e.g., due to cell overdischarge) is driven to or exhibits a potential below that of the other (the negative) electrode.

The phrase "negative electrode" refers to one of a pair of rechargeable cell electrodes that under normal circumstances and when the cell is fully charged will have the lowest potential. This terminology herein refers to the same physical electrode under all cell operating conditions even if such electrode is temporarily (e.g, due to cell overdischarge) driven to or exhibits a potential above that of the other (the positive) electrode.

"Redox chemical shuttle" refers to an electrochemically reversible moiety that during charging of an electrochemical cell can become oxidized at the positive electrode, migrate to the negative electrode, become reduced at the negative electrode to reform the unoxidized (or less-oxidized) shuttle species, and migrate back to the positive electrode.

When used with respect to a positive electrode of a lithium-ion cell, "recharged potential" refers to a value $E_{cp}$ (in volts) measured relative to $Li/Li^+$ by constructing a cell containing the positive electrode, a lithium metal negative electrode and an electrolyte containing no redox chemical shuttle, carrying out a charge/discharge cycling test and observing the potential at which the positive electrode becomes delithiated during the first charge cycle to a lithium level corresponding to at least 90% of the available recharged cell capacity. For some positive electrodes (e.g., $LiFePO_4$), this lithium level can correspond to approximately complete delithiation. For other positive electrodes (e.g., some electrodes having a layered lithium-containing structure), this lithium level can correspond to partial delithiation.

"Cyclable" when used in connection with a redox chemical shuttle refers to a material that when exposed to a charging voltage sufficient to oxidize the material (e.g., from a neutral to a cationic form, or from a less-oxidized state to a more oxidized state) and at an overcharge charge flow equivalent to 100% of the cell capacity will provide at least 2, at least 10, at least 15, at least 25, at least 40, at least 50, or even more cycles of overcharge protection for a cell containing the chosen positive electrode. By overcharge protection it is meant that the specific capacity of a cell incorporating the shuttle preserves up to about 50%, up to about 60%, up to about 70%, up to 80%, or even up to about 90% of the initial capacity of the cell after repeated cycling.

"Phase" refers to a homogeneous liquid portion that is present or that can form in a liquid system. The term "phases" refers to the presence of more than one phase in a heterogeneous liquid system. When used with respect to a mixture of a redox chemical shuttle and electrolyte, the terms "dissolved" and "dissolvable" refer to a shuttle that when present in or added to the electrolyte forms or will form a solution containing a mobile charge-carrying moiety in an amount sufficient to provide overcharge protection at a charging current rate sufficient to charge fully in 20 hours or less a lithium-ion cell containing the chosen positive electrode, negative electrode, and electrolyte.

When used with respect to a redox chemical shuttle, the phrase "oxidation potential" refers to a value $E_{cv}$ (in volts). $E_{cv}$ can be measured by dissolving the shuttle in the chosen electrolyte, measuring current flow versus voltage using cyclic voltammetry (CV) and a platinum or glassy carbon working electrode, a lithium or copper counter electrode and a lithium or non-aqueous Ag/AgCl reference electrode that has been previously referenced to $Li/Li^+$ and determining the potentials $V_{up}$ (i.e., during a scan to more positive potentials) and $V_{down}$ (i.e., during a scan to more negative potentials), relative to $Li/Li^+$, at which peak current flow is observed. $E_{cv}$ will be the average of $V_{up}$ and $V_{down}$. Shuttle oxidation potentials can be closely estimated (to provide a value "$E_{obs}$") by constructing a cell containing the shuttle, carrying out a charge/discharge cycling test, and observing during a charging sequence the potential at which a voltage plateau indicative of shuttle oxidation and reduction occurs. The observed result can be corrected by the amount of the negative electrode potential versus $Li/Li^+$ to provide an $E_{obs}$ value relative to $Li/Li^+$. Shuttle oxidation potentials can be approximated (to provide a value "$E_{calc}$") using modeling software such as GAUSSIAN 03 from Gaussian, Inc. to predict oxidation potentials (e.g., for compounds whose $E_{cv}$ is not known) by correlating model ionization potentials to the oxidation and reduction potentials and lithium-ion cell behavior of measured compounds.

In one aspect of this invention a rechargeable electrochemical cell is provided that includes a positive electrode having at least one electroactive material having a recharged potential, a negative electrode, a charge-carrying electrolyte comprising a charge carrying medium and an electrolyte salt, and a cyclable redox chemical shuttle comprising an aromatic compound substituted with at least one tertiary alkyl group and at least one halogenated alkoxy group dissolved in or dissolvable in the electrolyte and having an oxidation potential above the recharged potential of at least one of the electroactive materials of the positive electrode.

For shuttles of this aspect, the tertiary alkyl group can have the formula —$CR_3$ where each R group independently has up to 10, up to 6, up to 4, up to 2, or 1 carbon atom(s). Exemplary tertiary alkyl groups can for example have up to 12, up to 10, up to 8, up to 6, 5, or 4 carbon atoms. Preferably the shuttle contains at least two tertiary alkyl groups, which can be the same or different. If located on the same aromatic ring (e.g., a benzene ring), the tertiary alkyl groups can for example be oriented ortho, meta or para to one another.

The halogenated alkoxy group can have the formula —OR' where R' is a halogenated alkyl group having up to 10, up to 6, up to 4, up to 3, up to 2, or 1 carbon atom. R' can optionally contain catenary ether oxygen atoms in the alkyl chain. Exemplary halogenated alkoxy groups can, for example, have from 1 to 10, from 1 to 6, from 2 to 6, from 1 to 4, from 1 to 3, or 1 carbon atom. The shuttle preferably can contain at least two halogenated alkoxy groups which can be the same or different and can be linked to form a ring provided they are in close proximity. If located on the same aromatic ring the alkoxy groups can, for example, be oriented ortho, meta or para to one another. In a preferred embodiment, the halogen of the halogenated alkoxy group(s) can be fluorine. Most preferably, the halogenated alkoxy group can be partially fluorinated (i.e., it is halogenated with fluorine, but retains one or more C—H bonds, preferably alpha to the oxygen atom). Particularly preferred partially fluorinated alkoxy groups include: —$OCH_2F$, —$OCH_2CF_3$, —$OCH_2CF_2CF_3$, —$OCH_2CF_2CF_2CF_3$, —$OCH_2CF_2CF_2H$ and —$OCH_2CF_2CFHCF_3$.

Exemplary shuttles can, for example, contain from 1 to 3 aromatic rings that are fused or connected. Each aromatic ring can, for example, be carbocyclic. Examples of such aromatic rings include benzene, naphthalene, phenanthrene, anthracene, biphenyl, and the like. Shuttles containing just one aromatic ring are preferred and in such cases the aromatic ring preferably contains at least one hydrogen atom directly bonded to the aromatic ring.

Other substituents can be present on the shuttle aromatic ring or rings or on the tertiary alkyl group(s) or halogenated alkoxy group(s), so long as such substituents do not unduly interfere with desired results. Examples of factors affected by substituents include the shuttle's charge-carrying capability, oxidation potential or stability. The presence or absence of such substituents, and the relative orientation of the tertiary alkyl group(s) and halogenated alkoxy group(s), can affect such factors. For example, electron withdrawing groups can raise the shuttle oxidation potential and electron donating groups can lower it. Without being bound by theory, when a tertiary alkyl group and a halogenated alkoxy group are oriented ortho to one another on an aromatic ring, then in some embodiments it can be desirable for the other ring atom ortho to the halogenated alkoxy group to be unsubstituted or substituted with a substituent that is less bulky than a tertiary alkyl group. The shuttle can also be in the form of a salt, but is preferably uncharged in the unoxidized state.

In some embodiments, provided electrochemical cells can comprise a shuttle compound having the formula:

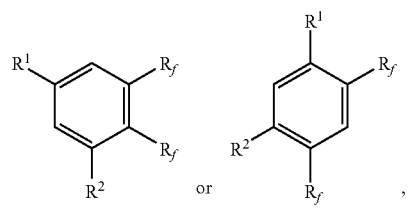

wherein $R^1$ and $R^2$ can each, independently, be H or a tertiary alkyl group with four to twelve carbon atoms, wherein at least one of $R^1$ or $R^2$ is a tertiary alkyl group, wherein each $R_f$ can, independently, be H or a halogenated alkoxy group having the formula —OR' where R' is a halogenated alkyl group having up to 10 carbon atoms, and wherein at least one $R_f$ is a halogenated alkoxy group.

Preferred shuttles include:

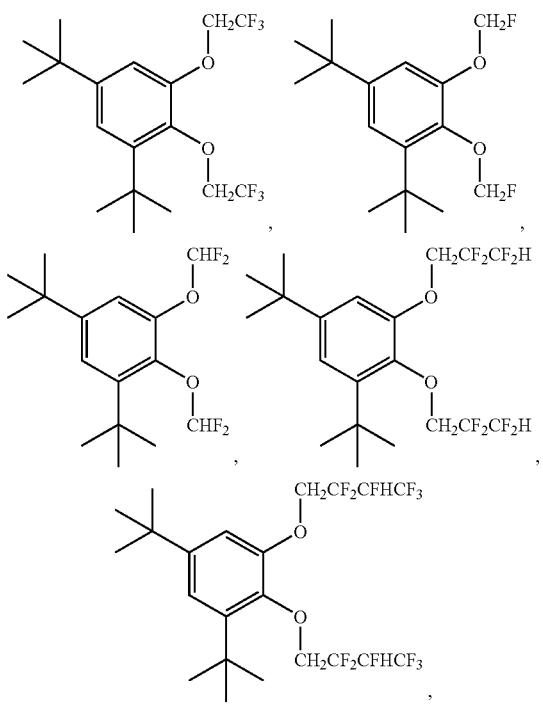

-continued

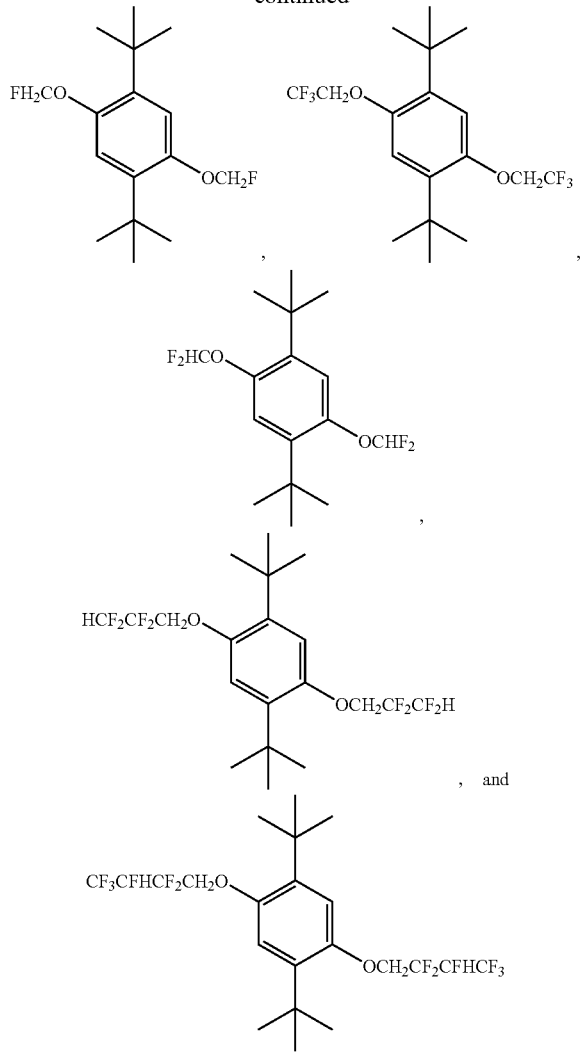

Provided redox shuttles can be prepared by methods that are well known in the art. For example, an aromatic compound containing at least one tertiary alkyl group and at least one hydroxyl group can be alkylated at the hydroxyl oxygen atom with a halogenated alkylating agent to convert the hydroxyl group to a halogenated alkoxy group. Useful halogenated alkylating agents include and are not limited to: $FCH_2I$, $FCH_2Br$, $CF_3CH_2OSO_2R_f'$, $CF_3CH_2OSO_2C_6H_4CH_3$, $CF_3CH_2OSO_2CH_3$, $HCF_2CF_2CH_2OSO_2R_f'$, and $CF_3CFHCF_2CH_2OSO_2R_f'$, where $R_f'$ can be a perfluoroalkyl group. When available, halogenated alkylating agents of the type, $ROSO_2R_f'$ (where R is a halogenated alkyl group and $R_f'$ is a perfluorinated alkyl group) are preferred due to their superior reactivity as halogenated alkylating agents. These sulfonate esters can be prepared by the reaction of partially halogenated alcohols with perfluoroalkanesulfonyl chloride, fluorides and anhydrides as described in T. Briza, et. al., *J. Fluorine Chem.*, 129(4), 235-247 (2008); M. Hanack, et. al., *J. Org. Chem.*, 54, 1432-1435 (1989); and L. Z. Gandelsman, et. al., *J. Org. Chem. USSR*, 14, 808 (1978). Alternatively, an aromatic compound containing at least one tertiary alkyl group and at least one methoxy group can be mono-chlorinated on the methoxy group by reaction with a free radical initiator, such as dibenzoyl peroxide, and a chlorinating agent, such as $CuCl_2$ or $PCl_5$. If desired, the resulting $ClCH_2O$— group bound to the aromatic ring can subsequently be converted to a $FCH_2O$— group using standard fluorine/chlorine exchange chemistry, such as by reaction with KF or tetrabutylammonium fluoride. Alternative methods of monofluoromethylation of O nucleophiles useful in preparing aromatic-O—$CH_2F$ compounds are described in G. K. Surya Prakash, et. al., *Organic Letters*, 10 (4), 557-560 (2008). Yet another method of synthesis is to start with an aromatic compound containing at least one halogenated alkoxy group (which can be prepared from phenols and anisoles and other hydroxylated or methoxylated aromatics by methods similar to those described above), and react the aromatic compound with a tertiary alcohol (such as t-butanol) or an isoolefin (such as isobutylene) in the presence of acid to add one or more tertiary alkyl groups to the aromatic ring via well known electrophilic aromatic substitution chemistry.

In another embodiment, a rechargeable electrochemical cell is provided that includes a positive electrode having at least one electroactive material having a recharged potential, a negative electrode, a charge-carrying electrolyte comprising a charge carrying medium and an electrolyte salt, and a cyclable redox chemical shuttle comprising an alkoxy-substituted fluoronaphthalene compound dissolved in or dissolvable in the electrolyte and having an oxidation potential above the recharged potential of at least one electroactive material of the positive electrode.

The alkoxy-substituted fluoronaphthalene compound can contain a total of 1 to about 4 alkoxy groups, typically 1 to 2 alkoxy groups, directly bound to the aromatic ring. The alkoxy group(s) can have the formula —OR' where R' can be an alkyl group having up to 10, up to 6, up to 4, up to 3, up to 2, or 1 carbon atom. Exemplary alkoxy groups can for example have from 1 to 10, from 1 to 6, from 2 to 6, from 1 to 4, from 1 to 3, or 1 carbon atom. Typical alkoxy groups are methoxy or ethoxy groups. R' can optionally be partially fluorinated and can further contain catenary ether oxygen atoms in the alkyl chain. Some shuttles can contain two or at least two alkoxy groups which can be the same or different. The alkoxy group(s) can occupy any of the available (non-bridgehead) positions on the naphthalene ring and any two alkoxy groups can be linked to from a ring, provided that they are in close proximity. Naphthalene ring positions that are not occupied by alkoxy groups can be occupied by H or F provided that there are no more than two hydrogens on the aromatic ring. Typically, there can be only one hydrogen on the aromatic ring and most preferably there are no hydrogens on the aromatic ring. In the latter case, all naphthalene ring positions not occupied by an alkoxy group are occupied by fluorine.

In some embodiments, provided electrochemical cells can comprise a shuttle compound having the formula:

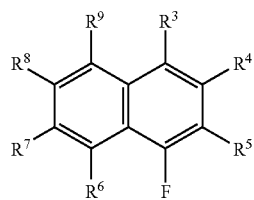

Wherein $R^3$-$R^9$ can be, independently, either F or O—R and where R is an alkyl group having from 1 to about 4 carbon atoms, and wherein each pair $R^4$ and $R^5$; $R^7$ and $R^8$; and/or $R^3$ and $R^9$ can, independently, form a ring of the structure —O—R—O— where R is an alkylene moiety having from 1 to about 4 carbon atoms.

Preferred alkoxy-substituted fluoronaphthalene shuttles include:

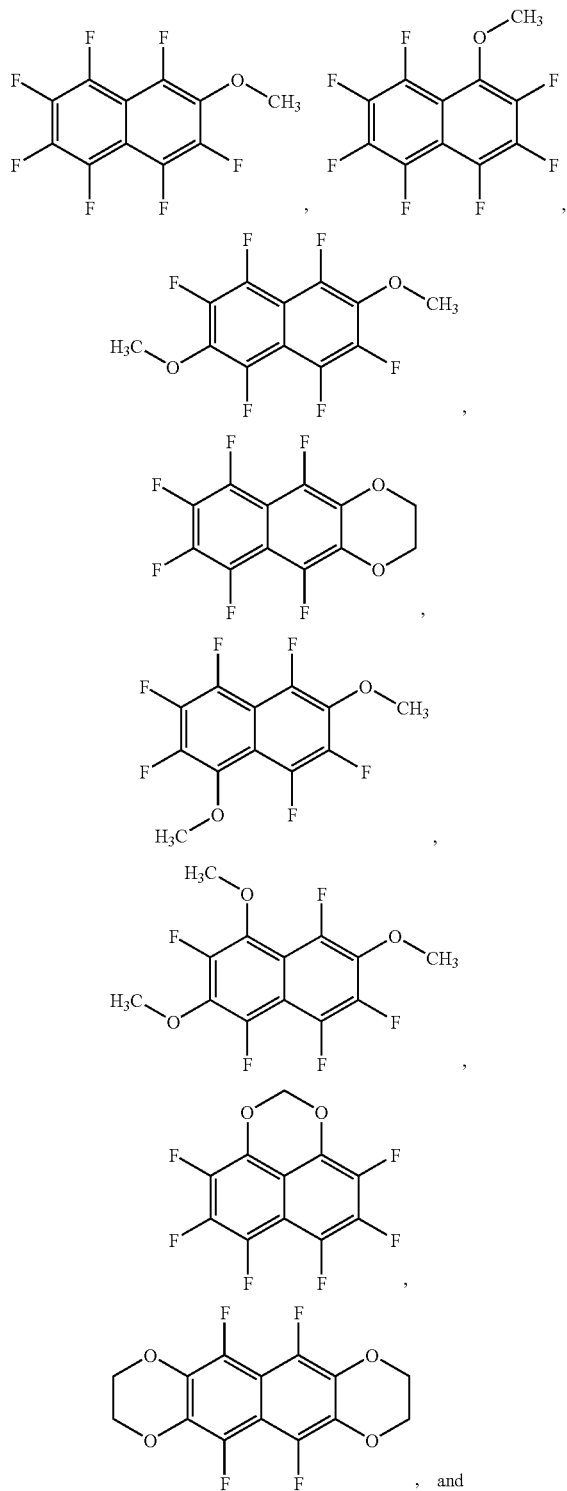

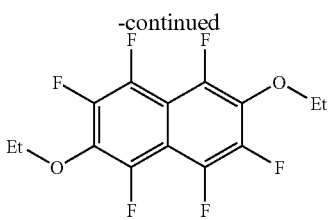

The alkoxy-substituted fluoronaphthalene compounds can be prepared by methods that are well known in the art. For example, one can react a fluorinated naphthalene compound containing one or more hydroxyl groups directly bound to the aromatic ring(s) with an appropriate alkylating agent, such as dimethylsulfate or diethylsulfate and the like, and a base to form the corresponding alkoxy-substituted fluoronaphthalene compound. Alternatively, one can react a highly fluorinated naphthalene compound, such as octafluoronaphthalene and the like, with an appropriate metal alkoxide, such as lithium, sodium, or potassium alkoxide and the like, to replace anywhere from one to four fluorine substituents on the aromatic ring with the corresponding alkoxide substituent. In some cases, the latter reaction can be facilitated by the presence of a phase transfer catalyst, such as a crown ether or a quaternary ammonium salt and the like.

A variety of positive electrodes materials can be employed in the disclosed lithium-ion cells. Representative positive electrode materials and their approximate recharged potentials can include $LiCoO_2$ (4.4 V versus (vs.) $Li/Li^+$), $FeS_2$ (3.0 V vs. $Li/Li^+$), $LiCoPO_4$ (4.8 V vs. $Li/Li^+$), $LiFePO_4$ (3.45 V vs. $Li/Li^+$), $Li_2FeS_2$ (3.0 V vs. $Li/Li^+$), $Li_2FeSiO_4$ (2.9 V vs. $Li/Li^+$), $LiMn_2O_4$ (4.1 V vs. $Li/Li^+$), $LiMnPO_4$ (4.1 V vs. $Li/Li^+$), $LiNiPO_4$ (5.1 V vs. $Li/Li^+$), $LiV_3O_8$ (3.7 V vs. $Li/Li^+$), $LiV_6O_{13}$ (3.0 V vs. $Li/Li^+$), $LiVOPO_4$ (4.15 V vs. $Li/Li^+$), $LiVOPO_4F$ (4.3 V vs. $Li/Li^+$), $Li_3V_2(PO_4)_3$ (4.1 V (2 Li) or 4.6 V (3 Li) vs. $Li/Li^+$), $MnO_2$ (3.4 V vs. $Li/Li^+$), $MoS_3$ (2.5 V vs. $Li/Li^+$), sulfur (2.4 V vs. $Li/Li^+$), $TiS_2$ (2.5 V vs. $Li/Li^+$), $TiS_3$ (2.5 V vs. $Li/Li^+$), $V_2O_5$ (3.6 V vs. $Li/Li^+$), $V_6O_{13}$ (3.0 V vs. $Li/Li^+$), $LiNi_{0.5}Mn_{1.5}O_4$ (4.7 V vs. $Li/Li^+$), and combinations thereof. In other embodiments, lithium mixed metal oxides of nickel, cobalt, and aluminum (NCA); or lithium mixed metal oxides of manganese, nickel, and cobalt (MNC); and doped versions thereof can be useful as positive electrodes in the provided cells. Other useful positive electrodes include lithium mixed metal oxide electrodes such as those described in U.S. Pat. Nos. 5,858,324, 5,900,385 (both Dahn et al.), and 6,964,828 (Lu et al.). Powdered lithium (e.g., LECTRO MAX stabilized lithium metal powder, from FMC Corp., Gastonia, N.C.) can be included in the positive electrode as formed. Lithium can also be incorporated into the negative electrode so that extractible lithium will be available for incorporation into the positive electrode during initial discharging. Some positive electrode materials can, depending upon their structure or composition, be charged at a number of voltages, and thus can be used as a positive electrode if an appropriate form and appropriate cell operating conditions are chosen. Electrodes made from, for example, $LiFePO_4$, $Li_2FeSiO_4$, $Li_xMnO_2$ (where x is from about 0.3 to about 0.4, and made for example by heating a stoichiometric mixture of electrolytic manganese dioxide and LiOH to about 300° C. to about 400° C.), or $MnO_2$ (made, for example, by heat treatment of electrolytic manganese dioxide to about 350° C.) can provide cells having desirable performance characteristics when used with provided redox shuttle compounds having oxidation potentials of greater than about 4.0 V relative to $Li/Li^+$. Exemplary redox shuttles that can provide desirable performance characteristics with these electrodes include octafluoronaphthalene, alkoxy-substituted fluoronaphthalenes and shuttles comprising an aromatic compound substituted with at least one tertiary alkyl group and at least one halogenated alkoxy group, as described above.

Electrodes made from $LiMn_2O_4$, $LiMnPO_4$, $LiVOPO_4$, and $Li_2V_2(PO_4)_3$, can provide cells having desirable performance characteristics when used with provided redox shuttle compounds having oxidation potentials of about 4.2 V to about 4.6 V relative to $Li/Li^+$. Electrodes made from $LiCoO_2$, $LiCoPO_4$, and $LiNiPO_4$ can provide cells having desirable performance characteristics when used with provided redox shuttle compounds having oxidation potentials of greater than 4.6 V, greater than 4.8 V, greater than 5.0 V, or even greater than 5.2 V. The positive electrode can contain additives as will be familiar to those skilled in the art, e.g., carbon black, flake graphite, and the like. As will be appreciated by those skilled in the art, the positive electrode can be in any convenient form including foils, plates, rods, pastes, or as a composite made by forming a coating of the positive electrode material on a conductive current collector or other suitable support.

In some cases it can be desirable to fabricate the positive electrode using a mixture of different positive electrode materials with different recharged voltages as described, for example, in U.S. Pat. Publ. No. 2007/0178370 (Amine et al.). In this case, the provided redox shuttle can have an oxidation potential greater than the recharged voltage of at least one of the positive electrode materials of the mixture. Generally the provided redox shuttle can have an oxidation potential greater than the recharged voltage of the principal positive electrode material (i.e., the positive electrode material that carries the greatest capacity within the fabricated positive electrode).

A variety of negative electrodes can be employed in the disclosed lithium-ion cells. Representative negative electrodes include graphitic carbons e.g., those having a spacing between (002) crystallographic planes, $d_{002}$, of 3.45 Å>$d_{002}$>3.354 Å and existing in forms such as powders, flakes, fibers, or spheres (e.g., mesocarbon microbeads); lithium metal; $Li_{4/3}Ti_{5/3}O_4$; the lithium alloy compounds described in U.S. Pat. Nos. 6,203,944 and 6,436,578, 6,699,336 (all Turner et al.); U.S. Pat. No. 6,255,017 (Turner); U.S. Pat. Publ. Nos. 2005/0031957, 2007/0128517, and 2008/0206641 (all Christensen et al.); U.S. Pat. Publ. No. 2006/0046144 (Obrovac); U.S. Pat. Publ. Nos. 2007/0020521, 2007/0020522, and 2007/0020528 (all Obrovac et al.); U.S. Pat. Publ. Nos. 2004/0121234 and 2007/0148544 (both Le); Sn—Co-based nanostructured negative electrodes (e.g., the negative electrode in the NEXELION hybrid lithium-ion battery from Sony Corp.); and combinations thereof. The lithium alloy compounds include combinations of lithium with active metals such as Ag, Au, Mg, Zn, Cd, Hg, Al, Ga, In, Tl, Ge, Sn, Pb, C, Si, Sb, and Bi. They can include amorphous mixtures or combinations of mixtures of lithium and active metals with other inactive materials and they can have more than one phase. A negative electrode containing extractable lithium (e.g., a lithium metal electrode, extractable lithium alloy electrode, or electrode containing powdered lithium) can be employed so that extractable lithium will be incorporated into the positive electrode during initial discharging. The negative electrode can contain additives as will be familiar to those skilled in the art, e.g., conductive diluents and binders. As will be appreciated by those skilled in the art, the negative electrode can be in any convenient form including foils, plates, rods, pastes or as a composite made by forming a coating of the negative electrode material on a conductive current collector or other suitable support.

The electrolyte provides a charge-carrying pathway between the positive and negative electrodes, and initially contains at least the charge carrying media and the electrolyte salt. The electrolyte can include other additives that will be familiar to those skilled in the art. As will be appreciated by those skilled in the art, the electrolyte can be in any convenient form including liquids, gels and dry polymer.

A variety of charge carrying media can be employed in the electrolyte. Exemplary media are liquids or gels capable of solubilizing sufficient quantities of lithium salt and redox chemical shuttle so that a suitable quantity of charge can be transported from the positive electrode to negative electrode. Exemplary charge carrying media can be used over a wide temperature range, e.g., from about −30° C. to about 80° C. without freezing or boiling, and are stable in the electrochemical window within which the cell electrodes and shuttle operate. Representative charge carrying media include ethylene carbonate, propylene carbonate, dimethyl carbonate, diethyl carbonate, ethylmethyl carbonate, butylene carbonate, vinylene carbonate, fluoroethylene carbonate, vinylethylene carbonate, fluoropropylene carbonate, γ-butyrolactone, methyl difluoroacetate, ethyl difluoroacetate, dimethoxyethane, diglyme (bis(2-methoxyethyl)ether), and combinations thereof.

A variety of lithium salts can be employed in the electrolyte of lithium or lithium-ion cells. Exemplary lithium salts are stable and soluble in the chosen charge-carrying media, provide high ionic conductivity, and perform well with the chosen lithium-ion cell chemistry. These include $LiPF_6$, $LiBF_4$, $LiClO_4$, lithium bis(oxalato)borate ("LiBOB"), $LiN(SO_2CF_3)_2$, $LiN(SO_2C_2F_5)_2$, $LiAsF_6$, $LiC(SO_2CF_3)_3$, and combinations thereof. In other types of electrochemical cells, salts containing cations other than lithium can be employed, such as sodium, magnesium, aluminum, quaternary ammonium, dialkylimidazolium, alkylpyridinium, dialkylpyrrolidinium, and the like.

A variety of electrolyte additives can also be employed to serve as passivating agents, gas suppression agents, stabilizers, or flame retardants, etc. These can typically be added to the formulated electrolyte in relatively low concentrations (less than 10 weight percent (wt %), less than 5 wt %, or less than 1 wt %) to improve the performance, stability and/or safety of the electrochemical cell or the stability of the redox shuttle. Common additives include but are not limited to VC (vinylene carbonate), ES (ethylene sulfite), FEC (fluoroethylene carbonate), 1,3-propenesultone, ethene sultone, 1,4-butene sultone, VEC (vinylethylene carbonate), $CO_2$, $SO_2$, 12-crown-4,18-crown-6, catechol carbonate, α-bromo-γ-butyrolactone, methylchloroformate, 2-acetoxy-4,4,-dimethyl-4-butanolide, succinimide, methyl cinnamate. Additional electrolyte additives are described in U.S. Pat. No. 7,026,074 (Chen et al.) and U.S. Pat. Publ. No. 2007/0092802 (Ahn et al.).

The electrolyte can contain the dissolved redox chemical shuttle. The electrolyte also can be formulated without dissolved redox chemical shuttle, and incorporated into a cell whose positive or negative electrode or separator contains dissolvable redox chemical shuttle that can dissolve into the electrolyte after cell assembly or during the first charge-discharge cycle, so that the electrolyte will contain dissolved redox chemical shuttle once the cell has been put into use. The optimal concentration of dissolved shuttle in the formulated electrolyte can depend on many factors, including charging rate, discharge rate, shuttle solubility in the formulated electrolyte, ambient temperature of cell operation, the diffusion coefficient of the shuttle, the stability of the shuttle under overcharge conditions, and the required lifetime of the shuttle under normal use conditions. Generally the concentration of dissolved redox chemical shuttle in the formulated electrolyte is between from about 0.005 M to about 0.50 M, or from about 0.05 M to about 0.25 M.

The provided redox shuttle compounds can be employed in the disclosed lithium-ion or electrochemical cells. When an attempt is made to charge the cell above the shuttle compound oxidation potential, the oxidized shuttle molecules carry a charge quantity corresponding to the applied charging current to the negative electrode, thus preventing cell overcharge. In some embodiments shuttle materials can be sufficiently cyclable to provide at least 10, at least 15, at least 25, at least 40, at least 50, or even more cycles of overcharge protection at C/10 rate and a charging voltage sufficient to oxidize the material and at an overcharge charge flow equivalent to 100% of the cell capacity during each cycle. In other embodiments shuttle materials can be sufficiently cyclable to provide at least 10, at least 15, at least 25, at least 40, at least 50, or even more cycles of overcharge protection at other cycling rates such as C/5, C/2, C, C2, and others. By overcharge protection it is meant that the specific capacity of a cell incorporating the shuttle preserves up to about 50%, up to about 60%, up to about 70%, up to 80%, or even up to about 90% of the initial capacity of the cell after repeated cycling. The provided shuttle compounds can be different from the positive electrode and can have an oxidation potential different from and higher (i.e., more positive) than the principal positive electrode material recharged potential. The oxidation potential can be just slightly higher than the principal positive electrode material recharged potential, below the potential at which irreversible cell damage might occur, and desirably below the potential at which excessive cell heating or outgassing might occur. As a general numeric guide for typical lithium-ion cell constructions, the redox shuttle compound can, for example, have an oxidation potential from about 0.1 V to about 2.0 V above the positive electrode recharged potential; from about 0.2 V to about 1.0 V above the positive electrode recharged potential; or from about 0.3 V to about 0.6 V above the positive electrode recharged potential. For example, $LiCoO_2$ positive electrodes have a recharged potential of from about 4.4 V vs. $Li/Li^+$. Exemplary redox shuttle compounds for use with such electrodes should have an oxidation potential of from about 4.6 V to about 5.4 V vs. $Li/Li^+$. $LiFePO_4$ positive electrodes have a recharged potential of about 3.45 V vs. $Li/Li^+$, and exemplary redox shuttle compounds for use with such electrodes desirably have an oxidation potential of from about 3.6 V to about 4.5 V vs. $Li/Li^+$. $Li_2FeSiO_4$ positive electrodes have a recharged potential of about 2.8 V vs. $Li/Li^+$, and exemplary redox shuttle compounds for use with such electrodes desirably have an oxidation potential of from about 3.0 V to about 3.8 V vs. $Li/Li^+$. $Li_xMnO_2$ (where x is from about 0.3 to about 0.4) and $MnO_2$ positive electrodes have a recharged potential of about 3.4 V vs. $Li/Li^+$, and exemplary redox shuttle compounds for use with such electrodes desirably have an oxidation potential of from about 3.7 V to about 4.4 V vs. $Li/Li^+$.

The disclosed electrochemical cells can be used in a variety of devices, including portable computers, tablet displays, personal digital assistants, mobile telephones, motorized devices (e.g., personal or household appliances and vehicles), instruments, illumination devices (e.g., flashlights) and heating devices. One or more electrochemical cells of this invention can be combined to provide a battery pack. Further details as to the construction and use of the provided lithium-ion cells and battery packs are familiar to those skilled in the art.

Objects and advantages of this invention are further illustrated by the following examples, but the particular materials and amounts thereof recited in these examples, as well as other conditions and details, should not be construed to unduly limit this invention.

EXAMPLES

Octafluoronaphthalene was obtained from Aldrich Chemical and was used as received. 2-Methoxyheptafluoronaphthalene was synthesized as described in the Preparative Example below. Mesocarbon microbeads (MCMB) used in anode fabrication were obtained from E-One/Moli Energy Canada, Maple Ridge, B.C., Canada. $LiFePO_4$ used in cathode fabrication was available from Phostech Lithium, Quebec, Canada). Ethylene carbonate (EC), propylene carbonate (PC), and dimthyl carbonate (DMC) were obtained from Ferro Corp. Fine Chemicals Division, Zachary, La., and $LiPF_6$ (available from Stella, Japan) was obtained from E-One/Moli Energy. Lithium bisoxalatoborate (LiBOB) was obtained from Chemetall (Germany). All solvents were high purity battery grade and were dried over 3 A molecular sieves before use.

Cyclic voltammograms were recorded in a standard 3-electrode cell using an electrolyte consisting of 0.1 M shuttle, 0.5 M $LiPF_6$ and 1:2:1:2 EC:DEC:PC:DMC by volume and a sweep rate of 100 mV/sec.

Coin-type test cells were built in 2325 coin cell hardware as described in A. M. Wilson, J. R. Dahn, *J. Electrochem. Soc.*, 142 (2), 326-332 (1995). Coin cells were fabricated with the resulting cathode electrode from above and a Li metal anode in 2325-size (23 mm diameter and 2.5 mm thickness) coin-cell hardware in a dry room. CELGARD #2400 microporous polypropylene film (Celgard Inc., Charlotte, N.C.) was used as a separator. The counter electrode was Li metal foil. The electrolyte was 0.75 M $LiPF_6$ in EC/DEC (1:2 by volume) with around 0.13 M of the redox shuttle added. The cells were sealed by crimping.

Negative electrodes of MCMB were made using the following procedure. 10 parts by weight of active material, 1 part by weight polyvinylidene fluoride (PVDF) and 1 part by weight SUPER S carbon clack (MMM Carbon, Tertre, Belgium) were mixed with N-methylpyrrolidinone (NMP) to form a slurry. After extensive mixing in a polyethylene bottle containing several 7 mm diameter $ZrO_2$ mixing media, the slurry was coated in a thin film on a copper foil current collector. Electrodes were dried at 90° C. in air overnight. Individual electrode discs 1.3 cm in diameter were cut from the electrode foil using a precision punch. Positive electrodes of $LiFePO_4$ were made in the same way, and were coated on aluminum foil.

Battery charge-discharge cycling was performed using a computer controlled charger produced by E-One/Moli Energy. Cells were charged and discharged using constant currents that we measure in "C-rate" here. For $LiFePO_4$, a 1C rate was taken to be 140 mA/g and for MCMB a 1C rate was taken to be 280 mA/g. MCMB/$LiFePO_4$ cells were discharged to 2.5 V and charged for a fixed capacity or until 4.9 V was reached. The charge discharge rates were selected to be C/10. All cells were assembled in an approximately "balanced" configuration, that is the negative electrode capacity equaled the positive electrode capacity. All cells were constructed with 20% to 30% excess capacity in the negative electrode so that during overcharge, the positive electrode is fully delithiated before the negative electrode is fully lithiated. This configuration prevents the possibility of having lithium plating on the negative electrode occur before the shuttling mechanism starts.

Preparatory Example 1

Synthesis of 2-methoxyheptafluoronaphthalene

Octafluoronapthalene (12 g, 0.044 mol), sodium methoxide (2.4 g 0.0448 mol) and anhydrous methanol were combined in a 100 mL round bottom flask fitted with a reflux condenser and a dry nitrogen bubbler. The mixture was refluxed for six hours. A sample was taken and analyzed by GC-FID. Conversion to the 2-methoxy heptafluoronapthalene at six hours was 35%. An additional 2.0 g of sodium methoxide was added and the mixture was refluxed for another 6 hours. The additional methoxide and reaction time did not increase the conversion to product. The insoluble solids were then filtered at room temperature and the crude product was recrystallized from aqueous methanol. The product was further purified by column chromatography on flash silica using hexane as an eluent. A total of 0.5 g of highly purified product was obtained. The structure was verified by GC/MS and purity by GC-FID was 99.7%.

Preparatory Example 2

Preparation of 1,4-bis(2,2,2-trifluoroethoxy)-2,5-di-tert-butylbenzene 2,5-di-t-butylhydroquinone (3.23 g, 0.014 mol), potassium carbonate (powdered, 325 mesh, 4.4 g, 0.032 mol), tri-n-butylamine (0.2 g, 0.0011 mol) and 30 g of acetone solvent were combined in a 100 mL 3-neck round bottom flask. The flask was equipped with an overhead stirrer, thermocouple, addition funnel, cold water condenser, heating mantle and a dry nitrogen bubbler. 2,2,2-Trifluoroethylnonaflate (12.5 g, 0.032 mol, Aldrich) was added dropwise over a 2 hour period while heating the reaction mix at 58° C. After stirring for 24 hours 80 mL of water was added at 58° C. and then the stirring was stopped and the heat was removed. The product, which crystallized in the lower phase at room temperature was filtered from the liquid using vacuum filtration. The crude product was then recrystallized from methanol/water which produced a sample of 99.5% purity by GC-FID. The product was then dissolved in 15 mL of heptane, which was then distilled away from the product to azeotropically remove trace amounts of water. The mass of the desired product was confirmed by GC/MS and the purity of the final sample was unchanged at 99.5%.

Preparatory Example 3

Preparation of 1,4-bis(2,2,3,3-tetrafluoropropoxy)-2,5-di-tert-butylbenzene

Sulfonate esters, such as 2,2,3,3-tetrafluoropropyl 1,1,2,2,3,3,4,4,4-nonafluorobutane-1-sulfonate, are prepared by the reaction of partially halogenated alcohols with perfluoroalkanesulfonyl fluorides as described in L. Z. Gandelsman, et al., *J. Org. Chem. USSR*, 14, 808 (1978).

2,5-Di-t-butylhydroquinone (30.0 g, 0.135 mol), potassium carbonate (Aldrich, 325 mesh powder, 49.6 g, 0.36 mol), 2,2,3,3-tetrafluoropropyl 1,1,2,2,3,3,4,4,4-nonafluorobutane-1-sulfonate (150 g, 0.36 mol), tetrabutylammonium bromide (1 g, 0.003 mol) and 150 mL of acetone were combined in a 600 mL Parr pressure reactor. The temperature was set to 75° C. Reaction progress was monitored by GC-FID over a 48 hour time period. The conversion to product reached 75% at which point no further progress was observed. The reaction mix was then transferred to a 1 L round bottom flask where 200 mL of water was added and the mix was stirred to dissolve the salts. The crystalline product that formed was filtered from the liquid and was recrystallized from acetone which gave a purity by GC of 99.7%. Residual water was removed by dissolving the product in 500 mL of heptane and distilling the heptane/water azeotrope away from the product. The molecular weight of the desired product was confirmed by GC/MS and final product purity by GC-FID was 99.7%.

Cycling Results

The examples below show that the shuttle functions repeatedly for cells subjected to practical charge and discharge rates. Table 1 lists the cells made and tested. FIG. 1 shows the charge-discharge cycling behavior of the cell of Example 1. This cell uses a MCMB negative electrode, a $LiFePO_4$ positive electrode and electrolyte A as described in Table 1. The cell was cycled at C/10 at 30° C. Although the discharge capacity of the cell decreases slightly with charge-discharge cycle number, the shuttle continues to function properly, by providing a stable charge capacity for more than 40 cycles and a stable shuttle effect as indicated by the extended overcharge plateau at 4.6 V (approx. 4.7 V vs. $Li/Li^+$) in the lower and middle panels.

TABLE 1

List of Cells tested. Electrolytes A, B, C and D are described in the Table footnote.

| Example | T (° C.) | C-Rate | Electrolyte and shuttle | Positive electrode mass (mg) | % overcharge per cycle | Negative |
|---|---|---|---|---|---|---|
| 1 | 30 | C/10 | A - Yes | 6.845 | 50 | MCMB |
| 2 | 30 | C/10 | B - Yes | 7.178 | 100 | MCMB |
| 3 | 30 | C/10 | A - Yes | 7.593 | 50 | MCMB |
| 4 | 30 | C/10 | C - Yes | 7.593 | 50 | MCMB |
| 5 | 30 | C/10 | D - Yes | 7.593 | 50 | MCMB |

Figure 2:
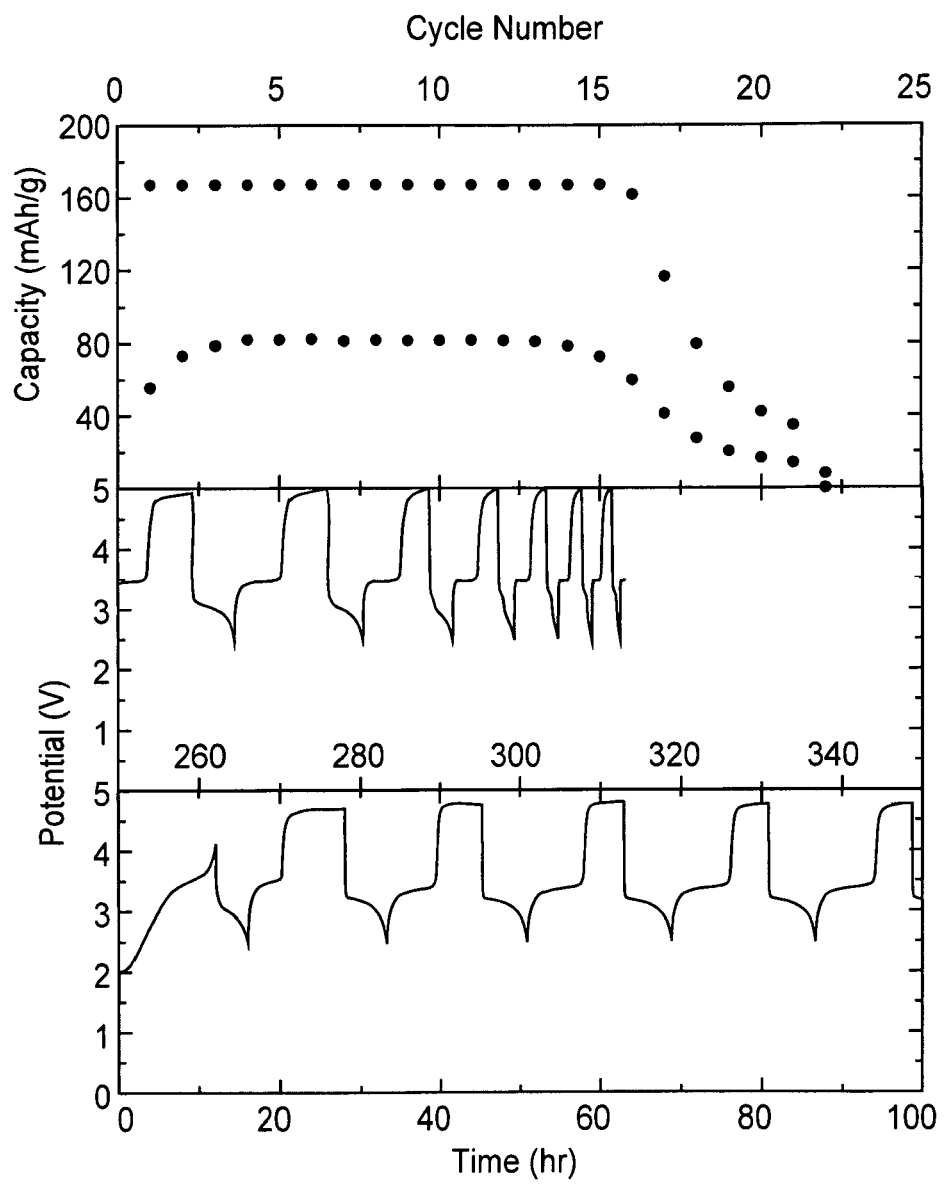
FIG. 2 is a graph of cycle number vs. charge/discharge capacity (mAh/g) (top panel) and time (h) vs. potential (V) (bottom panel) of another embodiment of the provided electrochemical cells.

Electrolytes: (OFN = octafluoronaphthalene, MHFN = 2-methoxyheptafluoronaphthalene)
A - 0.5 M LiBOB PC:DMC:EC:DEC 1:2:1:2 + 0.110 M OFN
B - 0.5 M $LiPF_6$ PC:DMC:EC:DEC 1:2:1:2 + 0.110 M OFN
C - 0.5 M LiBOB PC:DMC:EC:DEC 1:2:1:2 + 0.109 M MHFN
D - 0.5 M $LiPF_6$ PC:DMC:EC:DEC 1:2:1:2 + 0.109 M MHFN FIG. 2 shows the charge-discharge cycling behavior of the cell of Example 2. This cell uses a MCMB negative electrode, a $LiFePO_4$ positive electrode, and electrolyte B as described in Table 1. The cell was cycled at C/10 at 30° C. The shuttle functions properly, by providing a stable charge capacity (upper panel) for more than 16 cycles and a stable shuttle effect as indicated by the extended overcharge plateau at 4.6 V (approx. 4.7 V vs. $Li/Li^+$) in the lower and middle panels.

Figure 3:
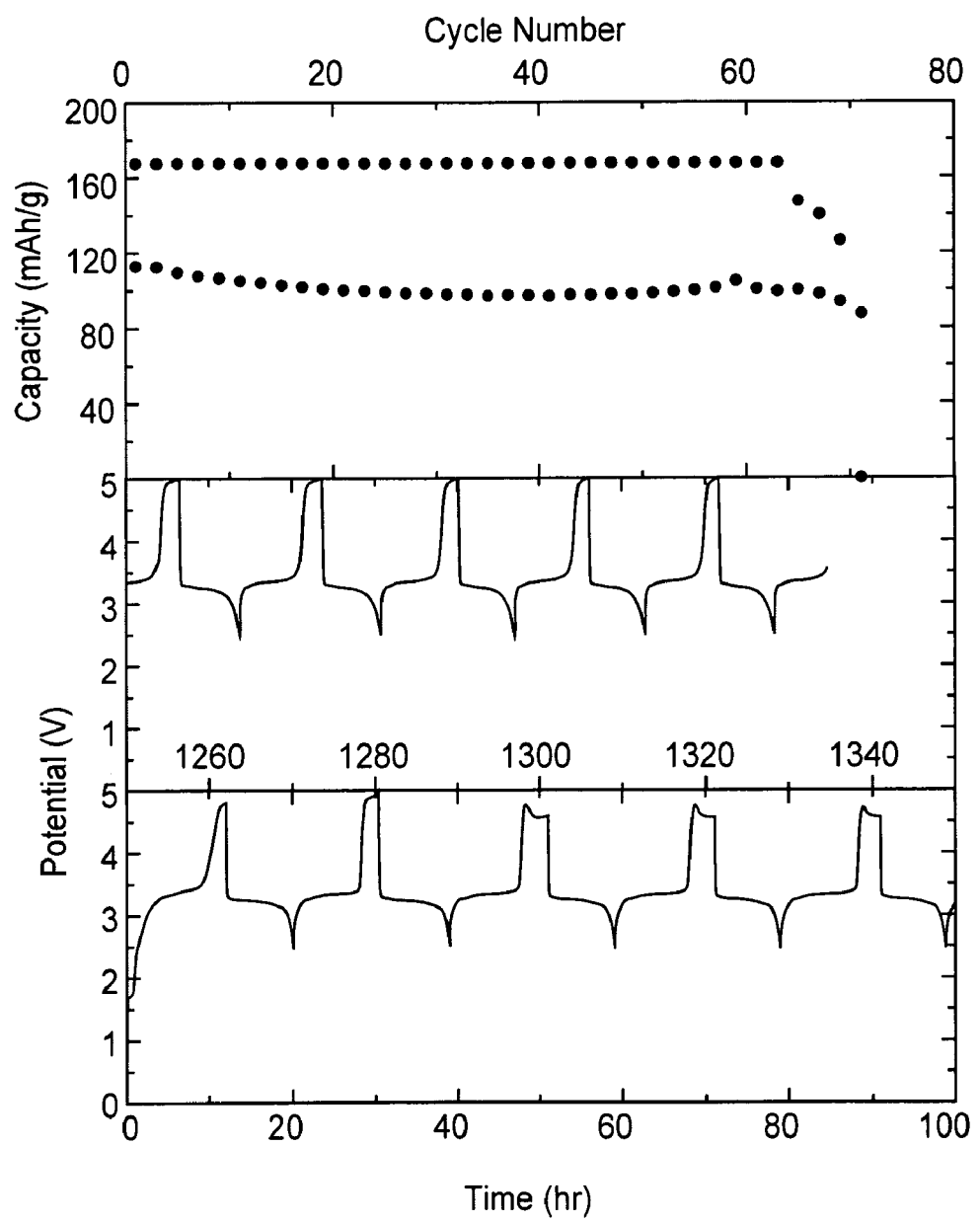
FIG. 3 is a graph of cycle number vs. charge/discharge capacity (mAh/g) (top panel) and time (h) vs. potential (V) (bottom panel) of another embodiment of the provided electrochemical cells.

FIG. 3 shows the charge-discharge cycling behavior of the cell of Example 3. This cell uses a MCMB negative electrode, a $LiFePO_4$ positive electrode and electrolyte A as described in Table 1. The cell was cycled at C/10 at 30° C. The shuttle functions properly, by providing a stable charge capacity (upper panel) for more than 65 cycles and a stable shuttle effect as indicated by the extended overcharge plateau at 4.6 V (approx. 4.7 V vs. $Li/Li^+$) in the lower and middle panels.

Figure 4:
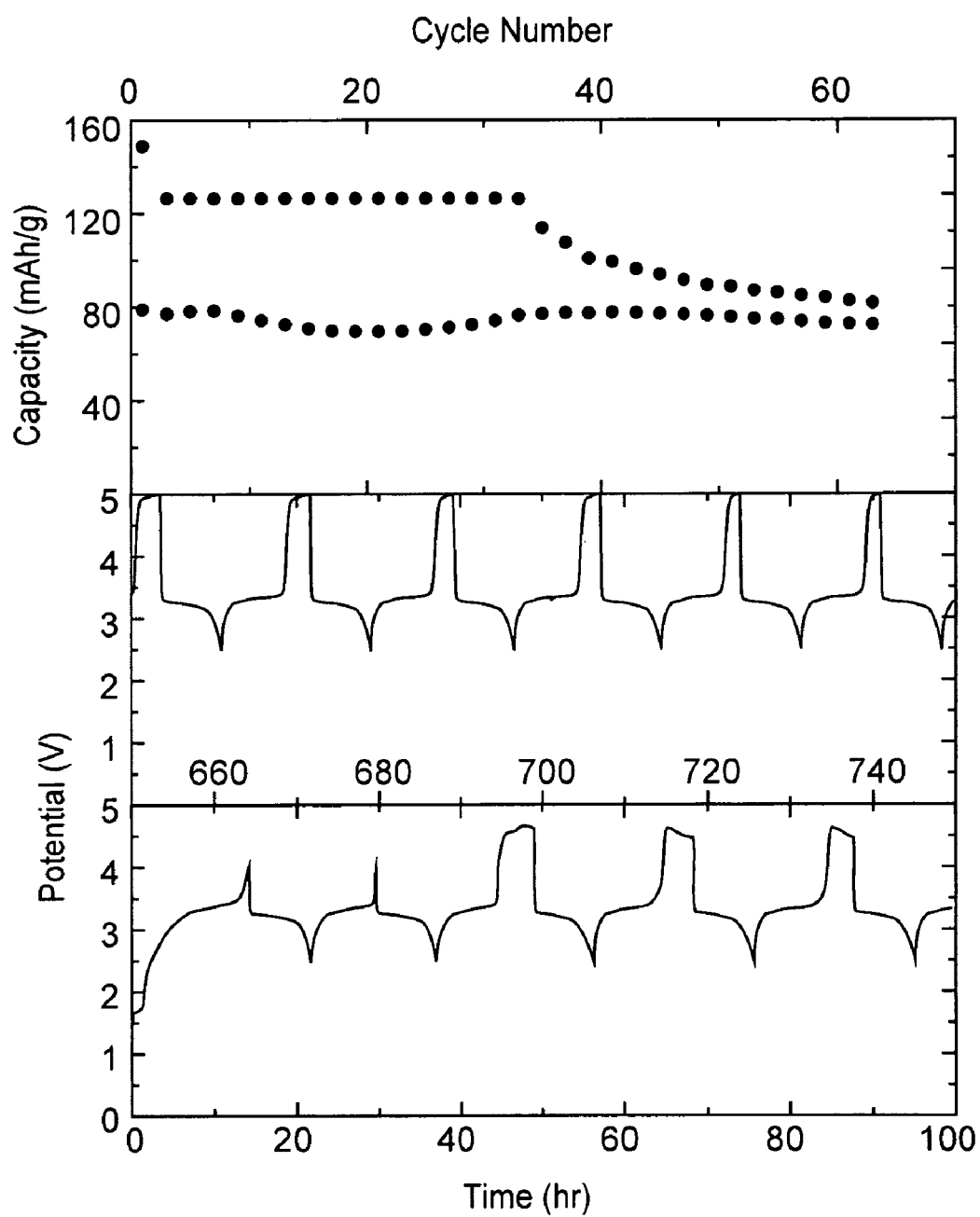
FIG. 4 is a graph of cycle number vs. charge/discharge capacity (mAh/g) (top panel) and time (h) vs. potential (V) (bottom panel) of another embodiment of the provided electrochemical cells.

FIG. 4 shows the charge-discharge cycling behavior of the cell of Example 4. This cell uses a MCMB negative electrode, a $LiFePO_4$ positive electrode and electrolyte C as described in Table 1. The cell was cycled at C/10 at 30° C. The shuttle functions properly, by providing a stable charge capacity (upper panel) for more than 30 cycles and a stable shuttle effect as indicated by the extended overcharge plateau at 4.5 V (approx. 4.6 V vs. Li/Li$^+$) in the lower and middle panels.

Figure 5:
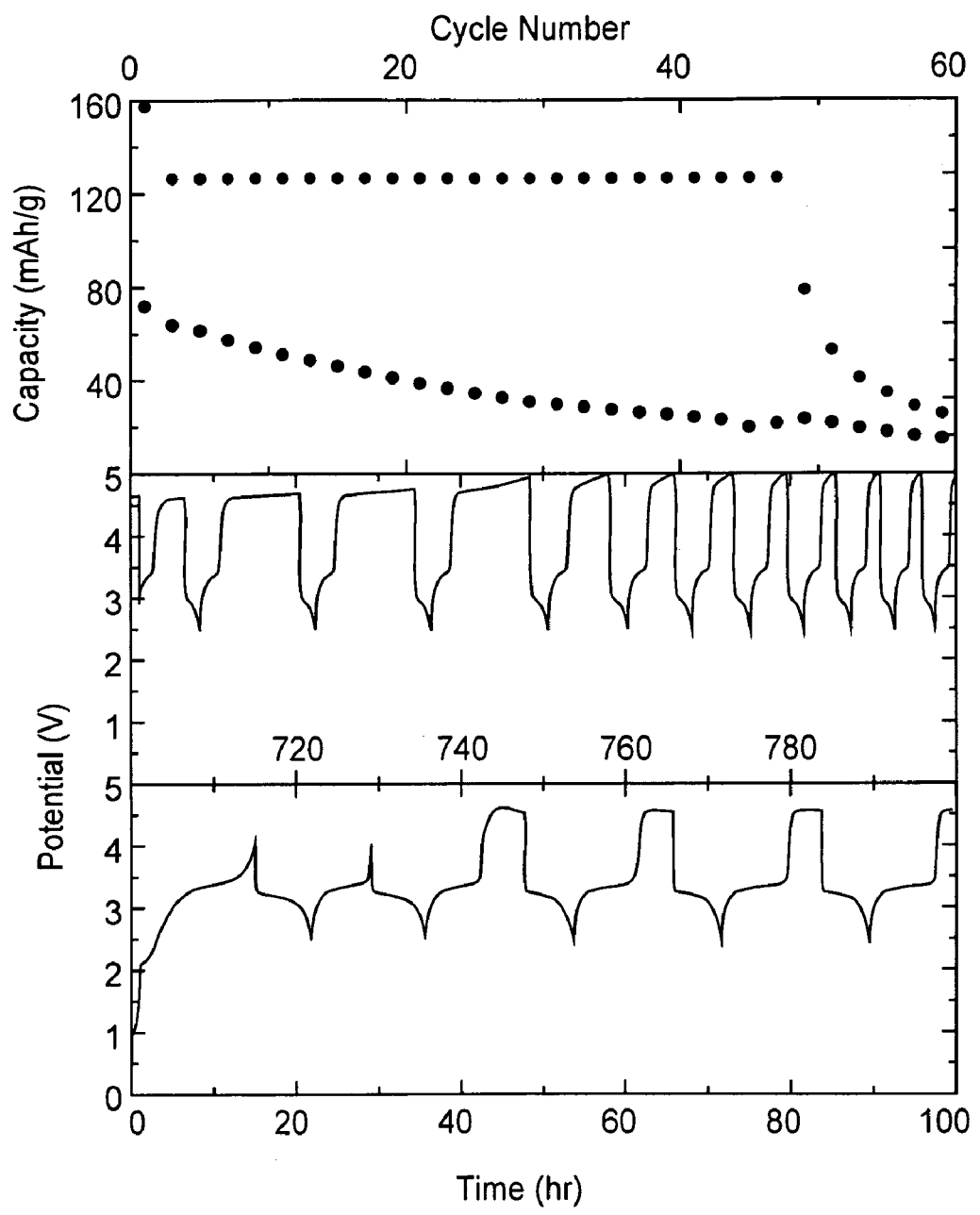
FIG. 5 is a graph of cycle number vs. charge/discharge capacity (mAh/g) (top panel) and time (h) vs. potential (V) (bottom panel) of another embodiment of the provided electrochemical cells.

FIG. 5 shows the charge-discharge cycling behavior of the cell of Example 5. This cell uses a MCMB negative electrode, a LiFePO$_4$ positive electrode and electrolyte D as described in Table 1. The cell was cycled at C/10 at 30° C. Even though the discharge capacity decreases slowly with cycle number, the shuttle functions properly, by providing a stable charge capacity (upper panel) for more than 50 cycles and a stable shuttle effect as indicated by the extended overcharge plateau at 4.5 V (approx. 4.6 V vs. Li/Li$^+$) in the lower and middle panels.

Figure 6:
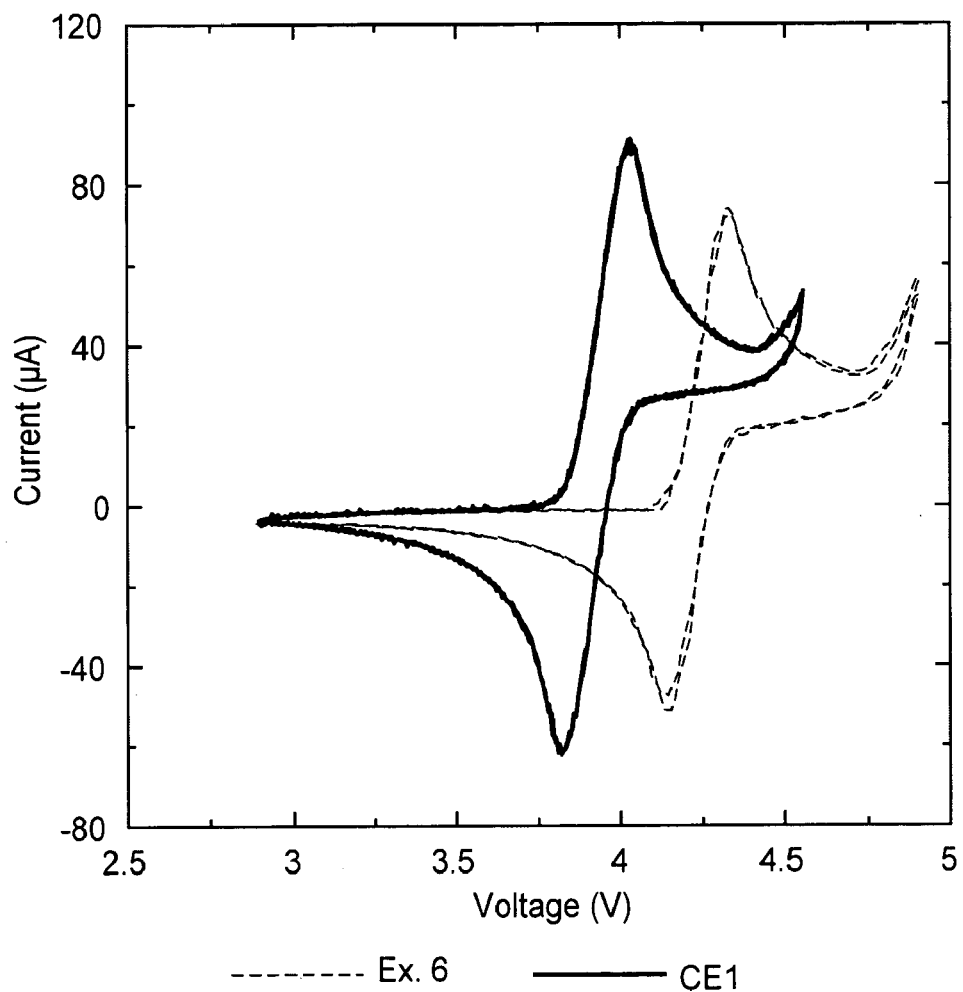
FIG. 6 is a cyclic voltammogram (CV) plot of an embodiment of the provided redox chemical shuttle and a comparative example from 2.5 to 5.0 V vs. $Li/Li^+$.
Figure 7:
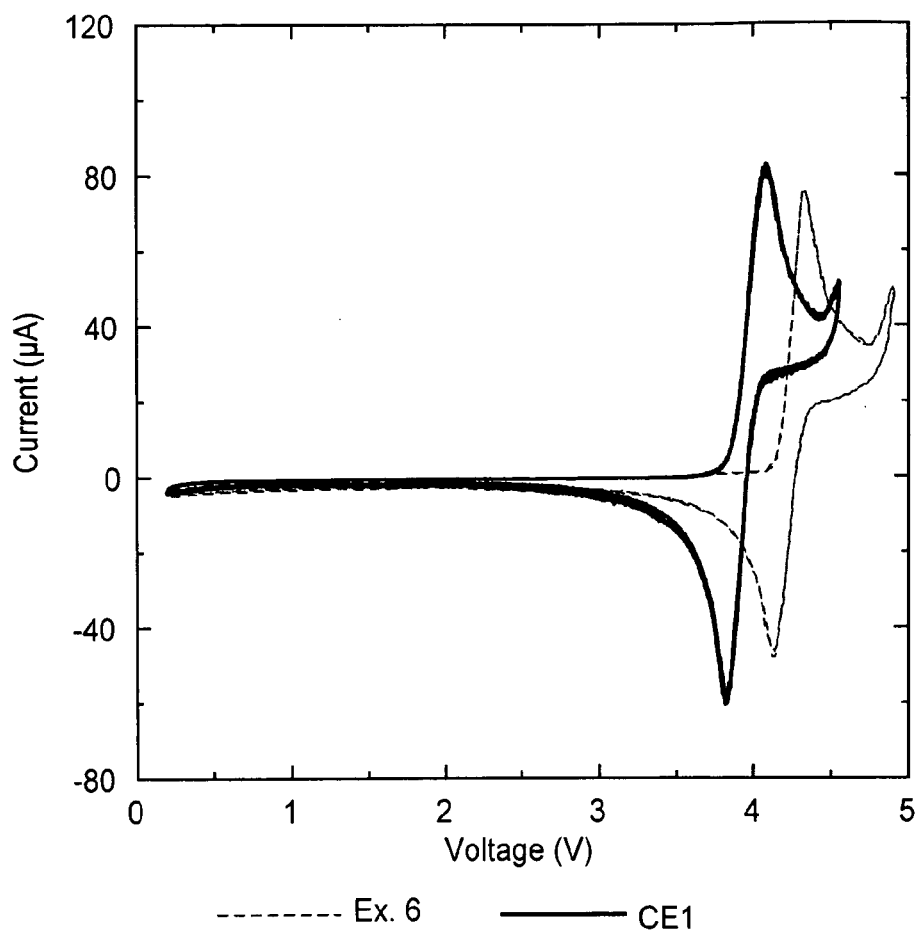
FIG. 7 is a CV plot of an embodiment of the provided redox chemical shuttle and a comparative example from 0 to 5 V vs. $Li/Li^+$.

Cyclic voltammetry of 1,4-bis(2,2,2-trifluoroethoxy)-2,5-di-tert-butylbenzene This example demonstrates that 1,4-bis(2,2,2-trifluoroethoxy)-2,5-di-tert-butylbenzene (made according to the procedure described in Preparatory Example 2) undergoes reversible electrochemical oxidation at a potential of about 4.25 V vs. Li/Li$^+$, as shown in FIGS. 6 and 7. Electrochemical reversibility is demonstrated by the high symmetry of the oxidation and reduction waves about 4.25 V and is an indication of the stability of the neutral and oxidized (radical cation) forms of the shuttle on the time frame of the cyclic voltammetry experiment. For comparison purposes is shown the corresponding CV of 1,4-di-t-butyl-2,5-dimethoxybenzene (Comparative Example 1), which is similar in structure to 1,4-bis(2,2,2-trifluoroethoxy)-2,5-di-tert-butylbenzene (Example 6) and is known to be a highly stable redox shuttle for use in LiFePO$_4$ cells with an oxidation potential of 3.92 V. The shape of the CVs is strikingly similar in the two cases, except that the CV of 1,4-bis(2,2,2-trifluoroethoxy)-2,5-di-tert-butylbenzene is shifted about 0.33 V to higher voltage, due to the effect of the electron withdrawing fluorine substituents on the two alkoxy groups. The higher oxidation potential of 1,4-bis(2,2,2-trifluoroethoxy)-2,5-di-tert-butylbenzene is expected to make it suitable for use with higher voltage cathodes, like LiMn$_2$O$_4$ or LiMnPO$_4$. As can be seen in FIG. 7, neither 1,4-bis(2,2,2-trifluoroethoxy)-2,5-di-tert-butylbenzene or 1,4-di-t-butyl-2,5-dimethoxybenzene undergo any significant reduction down to around 0.20 V vs. Li/Li$^+$, indicating that both molecules are stable to the low potentials commonly found at the charged anode of a lithium ion battery. In both FIGS. 6 and 7 it can be seen that both 1,4-bis(2,2,2-trifluoroethoxy)-2,5-di-tert-butylbenzene and 1,4-di-t-butyl-2,5-dimethoxybenzene eventually undergo a second irreversible oxidation if the voltage is driven too positive. For 1,4-bis(2,2,2-trifluoroethoxy)-2,5-di-tert-butylbenzene, the cutoff potential beyond which irreversible oxidation begins to occur is around 4.7 V vs Li/Li$^+$. Thus the effective use of this material in a Li-ion battery can require that the upper voltage limit of the positive electrode be set to less than 4.7 V vs Li/Li$^+$ to prevent shuttle decomposition.

Figure 8:
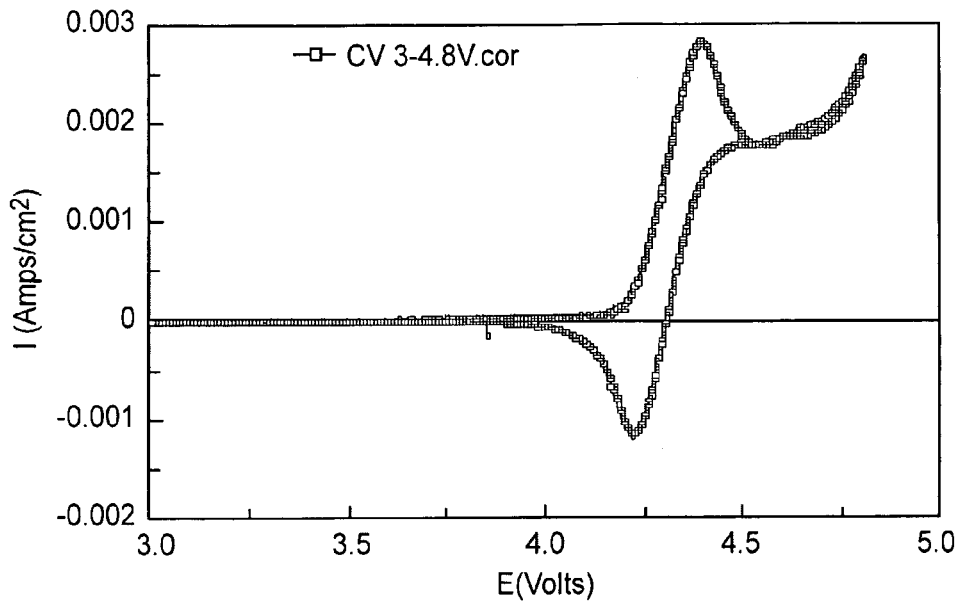
FIG. 8 is a CV plot of an embodiment of the provided redox chemical from 3.0 to 4.8 V vs. $Li/Li^+$.
Figure 9:
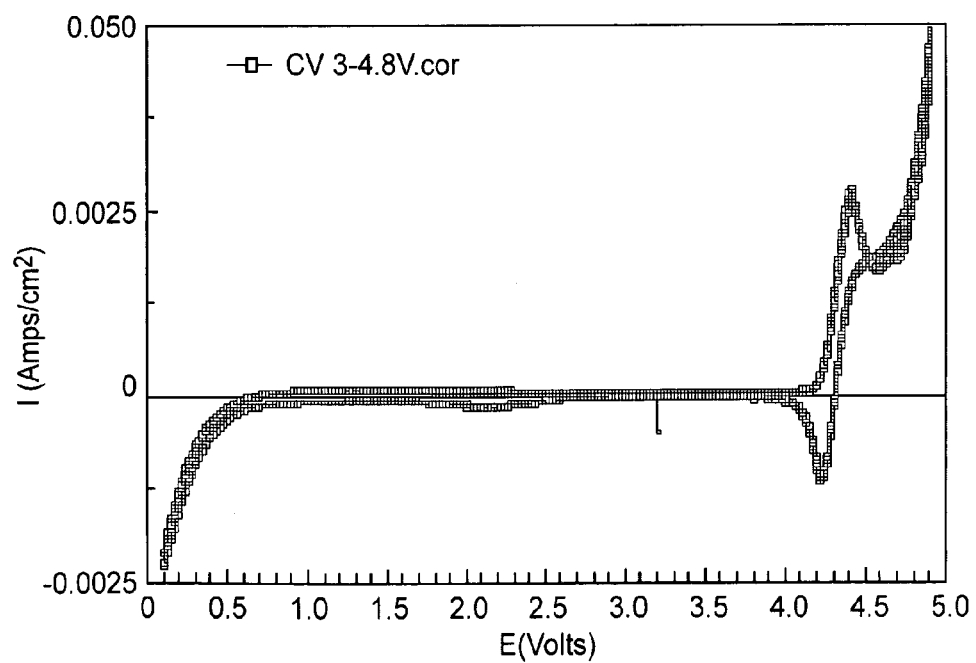
FIG. 9 is a CV plot of an embodiment of the provided redox chemical from 0 to 5 V vs. $Li/Li^+$.

Cyclic voltammetry of 1,4-bis(2,2,3,3-tetrafluoropropoxy)-2,5-di-tert-butylbenzene This example demonstrates that 1,4-bis(2,2,3,3-tetrafluoropropoxy)-2,5-di-tert-butylbenzene (made according to the procedure described in Preparatory Example 3) undergoes reversible electrochemical oxidation at a potential of 4.31 V vs. Li/Li$^+$, as shown in FIGS. 8 and 9. Electrochemical reversibility is demonstrated by the high symmetry of the oxidation and reduction waves about 4.31 V and is an indication of the stability of the neutral and oxidized (radical cation) forms of the shuttle on the time frame of the cyclic voltammetry experiment. The relatively high oxidation potential of 1,4-bis(2,2,3,3-tetrafluoropropoxy)-2,5-di-tert-butylbenzene is expected to make it suitable for use with high voltage cathodes, like LiMn$_2$O$_4$ or LiMnPO$_4$. As can be seen in FIG. 9, 1,4-bis(2,2,3,3-tetrafluoropropoxy)-2,5-di-tert-butylbenzene is stable to reduction down to around 0.50 V vs. Li/Li$^+$. In both FIGS. 8 and 9 it can be seen that 1,4-bis(2,2,3,3-tetrafluoropropoxy)-2,5-di-tert-butylbenzene undergoes a second irreversible oxidation at potentials above approximately 4.7 V vs Li/Li$^+$. Thus the effective use of this material in a Li-ion battery may require that the upper voltage limit of the positive electrode be set to less than 4.7 V vs Li/Li$^+$ to prevent shuttle decomposition.

Figure 10:
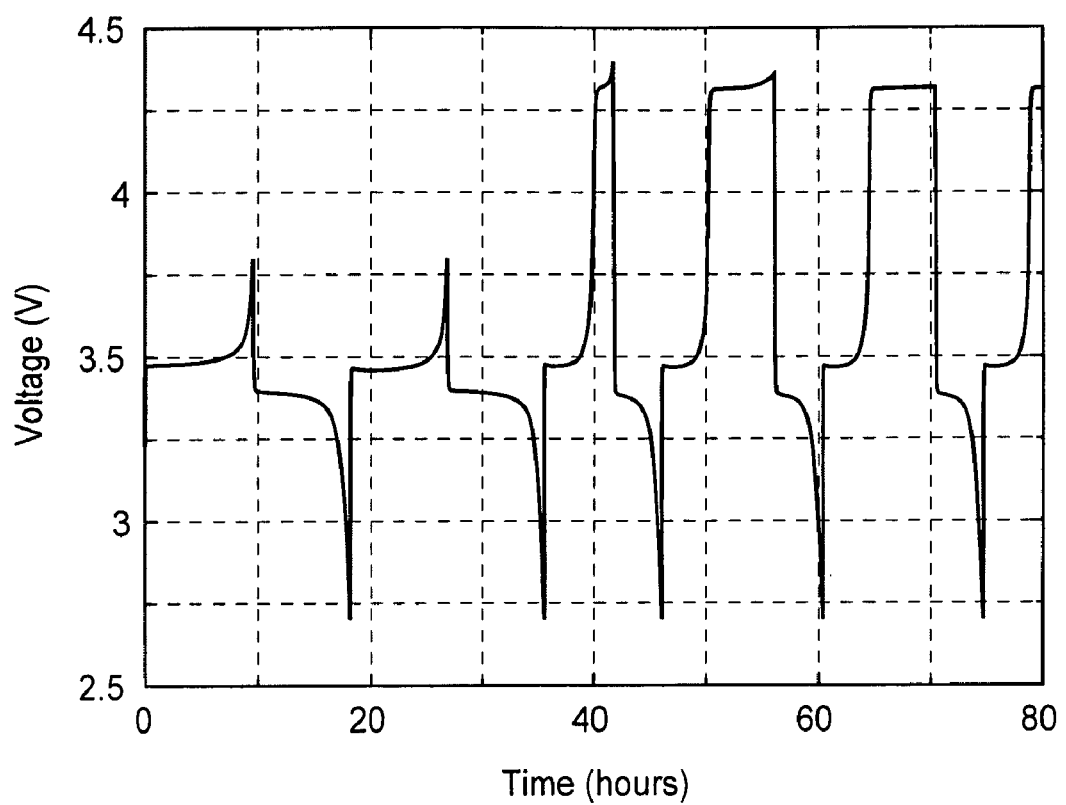
FIG. 10 is a graph of cell potential (V) vs. time (h) for the first 5 charge/discharge cycles of an embodiment of the provided electrochemical cells.

FIG. 10 shows cell potential (V) versus time in the first 5 cycles for a LiFePO$_4$/Li metal coin cell containing the shuttle additive, 1,4-bis(2,2,2-trifluoroethoxy)-2,5-di-tert-butylbenzene. The coin cell was cycled from 2.4 to 3.8 V at C/5 rate for the first two cycles. From the third cycle, the cell was charged to a cutoff voltage of 4.4 V or until the overall charging time reached 10 hours. The cell was then switched to discharge process when one of the two above conditions occurred. For example, in the third cycle the cell charge voltage reach a plateau at around 4.35 V vs. Li. The shuttling plateau lasted around 2 hours and then the cell voltage increased to the cutoff voltage of 4.4 V. In the fourth and fifth cycles in FIG. 10, the cell was charged for a total 10 hours and the cell shuttling plateau stayed flat at around 4.35 V vs. Li. The flat voltage plateau can be due to the efficient shuttling of excess charge through the electrolyte by the redox shuttle and is a measure of its effectiveness and stability in the cell under overcharge conditions. The stable voltage plateau showed that the shuttle additive was continuously being oxidized on LiFePO$_4$ electrode surface and reduced on Li anode surface without significant decomposition.

Figure 11:
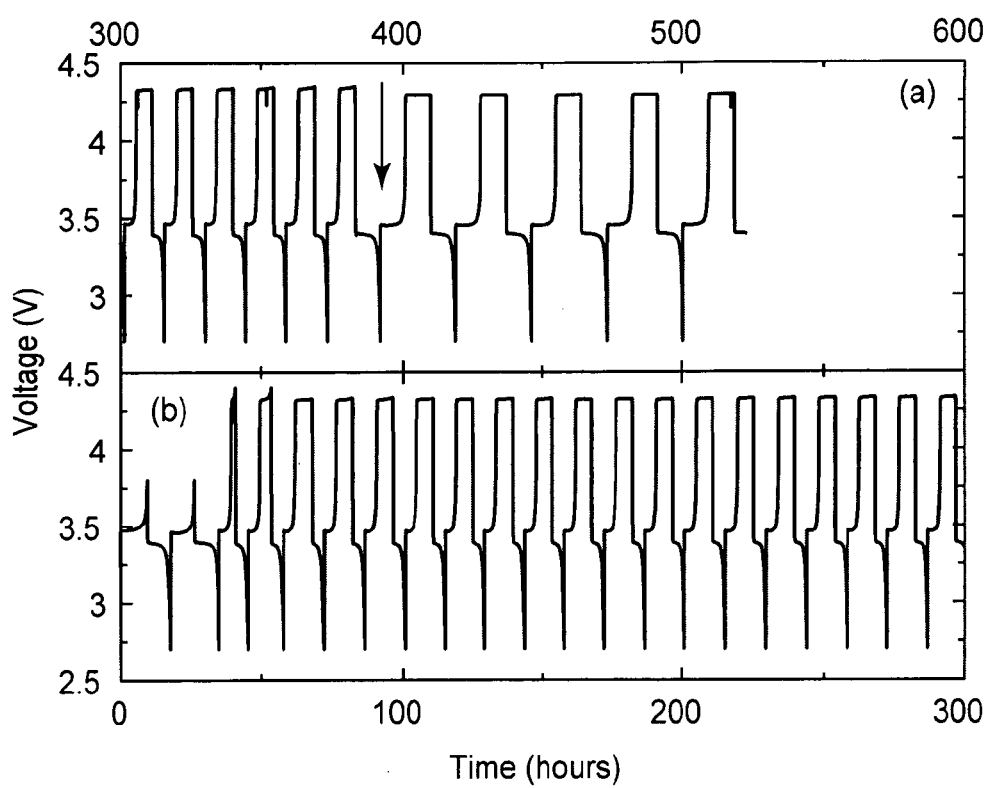
FIG. 11 is a graph of cell potential (V) vs. time (h) for an embodiment of the provided electrochemical cells.

FIG. 11 shows the cell voltage versus time for the LiFePO$_4$/Li cell containing the same shuttle additive, 1,4-bis(2,2,2-trifluoroethoxy)-2,5-di-tert-butylbenzene. The cycling data are from the same cell in FIG. 10, but are recorded over a longer time frame and many more overcharge cycles. The charge/discharge rate was decreased from C/5 to C/10 rate after 390 hours (cycle 28) as indicated in the graph by the arrow. The cell shows a stable shuttling voltage plateau around 4.35 V at C/5 rate and approximately 4.30 V at C/10 rate during each cycle. The shuttle has survived for over 31 cycles to date without significant degradation in performance.

Figure 12:
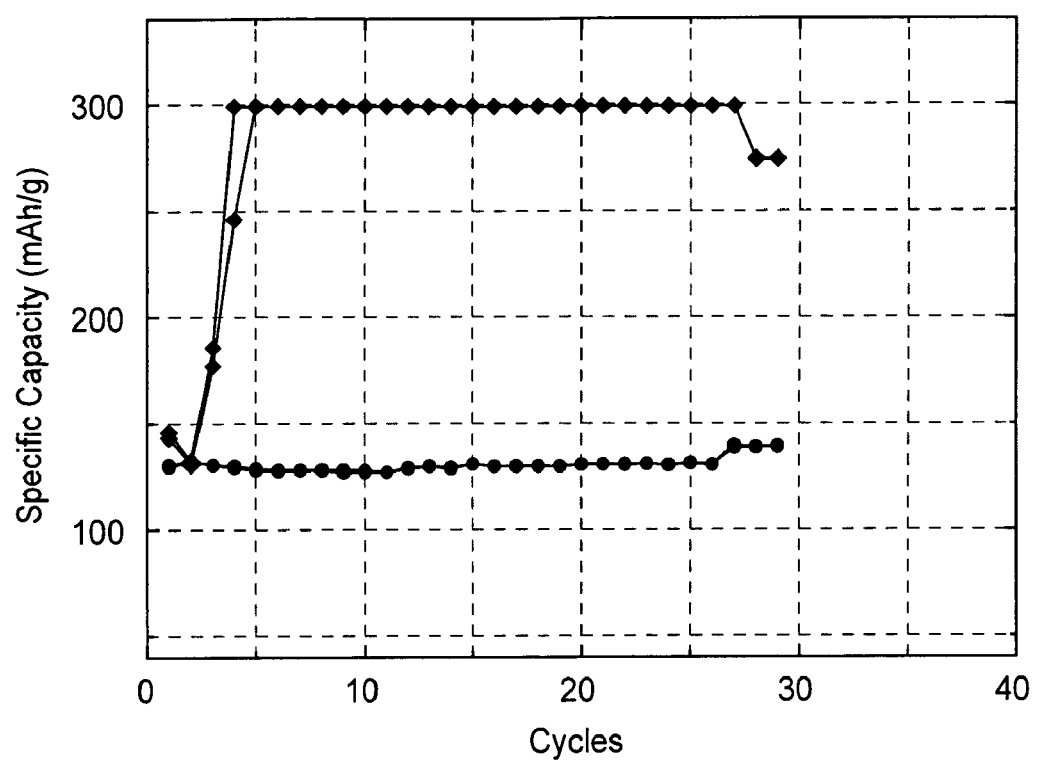
FIG. 12 is a graph of specific charge/discharge capacity (mAh/g) vs. cycle number for an embodiment of the provided electrochemical cells.

FIG. 12 shows the cell charge and discharge capacity during cycling for 2 separate cells containing the shuttle additive, 1,4-bis(2,2,2-trifluoroethoxy)-2,5-di-tert-butylbenzene. Both cells delivered very stable discharge capacity at around 130 mAh/g. The charge capacity stabilized at around 300 mAh/g. The overcharge capacity at around 4.3 V for each cycle was calculated to be 170 mAh/g, which is around 130% of the cell discharge capacity. The data indicate that the cells were charged to about 130% of actual cell capacity on each cycle. Over the course of 30 cycles the cells have been overcharged by a total of almost 4,000% of the actual cell capacity without significant degradation in shuttle or cell performance.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All of the references cited herein are hereby incorporated by reference in their entirety.

What is claimed is:

1. A rechargeable electrochemical cell comprising:
   a positive electrode having at least one electroactive material having a recharged potential;
   a negative electrode;
   a charge-carrying electrolyte comprising a charge carrying medium and an electrolyte salt; and
   a cyclable redox chemical shuttle comprising an aromatic compound substituted with at least one tertiary alkyl group and at least one halogenated alkoxy group, dissolved in or dissolvable in the electrolyte and having an oxidation potential above the recharged potential of at least one of the electroactive materials of the positive electrode principal electroactive material.

2. The cell according to claim 1, wherein at least one alkoxy group comprises a fluorinated alkoxy group.

3. The cell according to claim 2, wherein the partially fluorinated alkoxy group comprises from one to about four carbon atoms.

4. The cell according to claim 3, wherein the partially fluorinated alkyl group(s) are selected from —OCH$_2$F, —OCH$_2$CF$_3$, —OCH$_2$CF$_2$CF$_3$, —OCH$_2$CF$_2$CF$_2$CF$_3$, —OCH$_2$CF$_2$CF$_2$H and —OCH$_2$CF$_2$CFHCF$_3$.

5. The cell according to claim 1, wherein the aromatic compound is substituted with at least two tertiary alkyl groups and at least two halogenated alkoxy groups.

6. The cell according to claim 1, wherein at least one tertiary alkyl group comprises a butyl group.

7. The cell according to claim 1, wherein the shuttle comprises a compound having the formula:

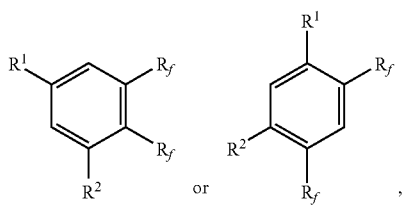

wherein R$^1$ and R$^2$ can each, independently, be H or a tertiary alkyl group with four to twelve carbon atoms, wherein at least one of R$^1$ or R$^2$ is a tertiary alkyl group, wherein each R$_f$ can, independently, be H or a halogenated alkoxy group having the formula —OR' where R' is a halogenated alkyl group having up to 10 carbon atoms, and wherein at least one R$_f$ is a halogenated alkoxy group.

8. The cell according to claim 7, wherein the shuttle is selected from

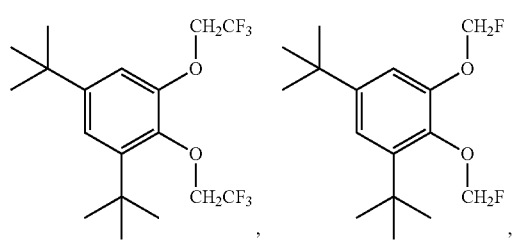

9. The cell according to claim 1, wherein at least one of the electroactive materials of the positive electrode has a recharged potential of greater than or equal to 4.0 V vs. Li/Li$^+$.

10. An electronic device comprising an electrochemical cell according to claim 1.

11. A rechargeable electrochemical cell comprising:
    a positive electrode having at least one electroactive material having a recharged potential;

a negative electrode;

a charge-carrying electrolyte comprising a charge carrying medium and an electrolyte salt; and a cyclable redox chemical shuttle comprising an alkoxy-substituted fluoronaphthalene compound dissolved in or dissolvable in the electrolyte and having an oxidation potential above the recharged potential of at least one of the electroactive materials of the positive electrode.

12. The cell according to claim 11, wherein at least one alkoxy group on the alkoxyl-substituted fluoronaphthalene compound is selected from methoxy and ethoxy.

13. The cell according to claim 11, wherein the alkoxy-substituted fluoronaphthalene compound comprises no hydrogen atoms attached directly to the naphthalene ring.

14. The cell according to claim 11, comprising a shuttle compound having the formula:

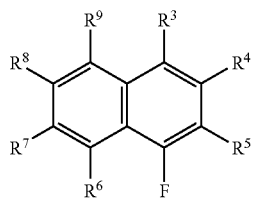

wherein $R^3$-$R^9$ can be, independently, either F or O—R and where R is an alkyl group having from 1 to about 4 carbon atoms, and wherein each pair $R^4$ and $R^5$; $R^7$ and $R^8$; and/or $R^3$ and $R^9$ can, independently, form a ring of the structure —O—R—O— where R is an alkylene moiety having from 1 to about 4 carbon atoms.

15. A cell according to claim 14, wherein the shuttle is selected from

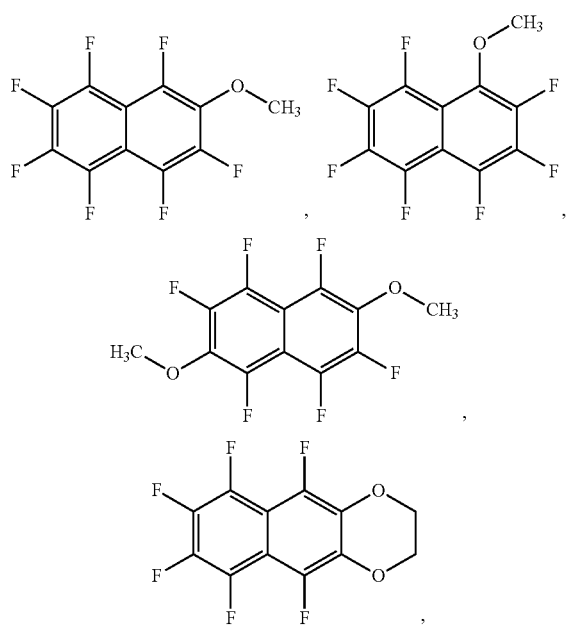

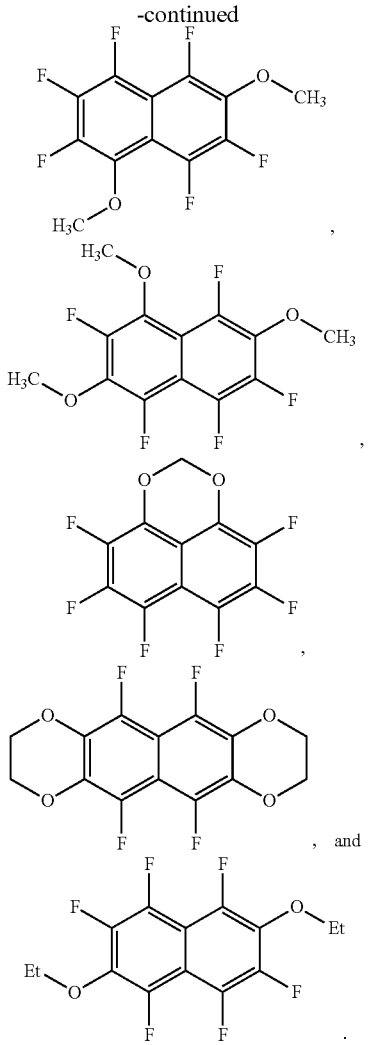

, and

16. A rechargeable lithium-ion cell comprising:
a positive electrode having at least one electroactive material having a recharged potential and comprising $LiFePO_4$; $Li_2FeSiO_4$; $MnO_2$; $LiMn_2O_4$; $LiMnPO_4$; $LiCoO_2$; $LiNi_{0.5}Mn_{1.5}O_4$; lithium mixed metal oxides of nickel, cobalt, and aluminum; lithium mixed metal oxides of manganese, nickel, and cobalt; combinations of the above; or doped versions thereof;

a negative electrode comprising graphitic carbon, lithium metal, lithium titanate, or a lithium alloy; and a charge-carrying electrolyte comprising:
a charge-carrying media comprising ethylene carbonate, propylene carbonate, dimethyl carbonate, diethyl carbonate, vinylene carbonate, ethyl methyl carbonate, or combinations thereof;
a lithium salt; and
a cyclable redox chemical shuttle selected from an aromatic compound substituted with at least one tertiary alkyl group and at least one halogenated alkoxy group, an alkoxy-substituted fluoronaphthalene compound, or a combination thereof, wherein the shuttle is dissolved in or dissolvable in the electrolyte and wherein the shuttle has an oxidation potential above the recharged potential of at least one of the electroactive materials of the positive electrode.

17. The cell according to claim 16, wherein the lithium salt is selected from $LiPF_6$, lithium bis(oxalato)borate, $LiBF_4$, $LiClO_4$, $LiAsF_6$, $LiN(SO_2CF_3)_2$, $LiN(SO_2C_2F_5)_2$, $LiC(SO_2CF_3)_3$, and combinations thereof.

18. An electronic device comprising an electrochemical cell according to claim 16.

19. A method of making a rechargeable electrochemical cell comprising:
providing a cell containing a positive electrode having at least one electroactive material having a recharged potential, and a negative electrode; and
adding a charge-carrying electrolyte comprising a charge carrying medium and an electrolyte salt to the cell, and a cyclable redox chemical shuttle selected from an aromatic compound substituted with at least one tertiary alkyl group and at least one halogenated alkoxy group, an alkoxy-substituted fluoronaphthalene compound, or a combination thereof, wherein the shuttle is dissolved in or dissolvable in the electrolyte and wherein the shuttle has an oxidation potential above the recharged potential of at least one of the electroactive materials of the positive electrode.

20. An electrolyte solution comprising a charge-carrying medium, an electrolyte salt, and a cyclable redox chemical shuttle selected from an aromatic compound substituted with at least one tertiary alkyl group and at least one halogenated alkoxy group, an alkoxy-substituted fluoronaphthalene compound, or a combination thereof, wherein the redox chemical shuttle has a reversible oxidation potential from about 3.7 V to about 4.8 V vs. $Li/Li^+$.

* * * * *